US007103590B1

(12) United States Patent
Murthy et al.

(10) Patent No.: US 7,103,590 B1
(45) Date of Patent: Sep. 5, 2006

(54) METHOD AND SYSTEM FOR PIPELINED DATABASE TABLE FUNCTIONS

(75) Inventors: Ravi Murthy, Hayward, CA (US); Ajay Sethi, Bangalore (IN); Bhaskar Ghosh, Burlingame, CA (US); Ashish Thusoo, San Mateo, CA (US); Shashaanka Agrawal, Redwood City, CA (US); Adiel M. Yoaz, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 257 days.

(21) Appl. No.: 09/938,982

(22) Filed: Aug. 24, 2001

(51) Int. Cl.
*G06F 17/30* (2006.01)

(52) U.S. Cl. .................. 707/3; 707/100; 709/201

(58) Field of Classification Search ........... 707/1–5, 707/100, 103 R, 203, 206, 10, 102, 104.1, 707/200, 7, 20, 204; 709/203, 222, 223, 709/224, 228, 201; 715/513, 514, 141, 530

See application file for complete search history.

(56) References Cited

U.S. PATENT DOCUMENTS

| 4,803,613 | A | * | 2/1989 | Kametani et al. .............. 700/3 |
| 4,905,138 | A | * | 2/1990 | Bourne ...................... 717/139 |
| 5,175,856 | A | * | 12/1992 | Van Dyke et al. .......... 717/151 |
| 5,241,648 | A | * | 8/1993 | Cheng et al. .................. 707/7 |
| 5,303,149 | A |  | 4/1994 | Janigian |
| 5,305,389 | A |  | 4/1994 | Palmer |
| 5,359,724 | A |  | 10/1994 | Earle |
| 5,408,630 | A |  | 4/1995 | Moss ......................... 711/112 |
| 5,410,698 | A | * | 4/1995 | Danneels et al. ........... 719/331 |
| 5,446,858 | A |  | 8/1995 | Copeland et al. |
| 5,499,355 | A |  | 3/1996 | Krishnamohan et al. .... 711/137 |
| 5,586,260 | A |  | 12/1996 | Hu |
| 5,600,316 | A |  | 2/1997 | Moll |
| 5,604,490 | A |  | 2/1997 | Blakley, III et al. |
| 5,632,015 | A |  | 5/1997 | Zimowski et al. |
| 5,724,588 | A | * | 3/1998 | Hill et al. ................... 719/328 |
| 5,754,771 | A |  | 5/1998 | Epperson et al. |
| 5,764,890 | A |  | 6/1998 | Glasser et al. |
| 5,765,159 | A | * | 6/1998 | Srinivasan .................. 707/102 |
| 5,787,461 | A |  | 7/1998 | Stephens |
| 5,794,228 | A |  | 8/1998 | French et al. |
| 5,797,001 | A |  | 8/1998 | Augenbraun et al. |
| 5,799,302 | A |  | 8/1998 | Johnson et al. |
| 5,802,528 | A |  | 9/1998 | Oki et al. |
| 5,802,569 | A |  | 9/1998 | Genduso et al. |
| 5,812,527 | A |  | 9/1998 | Kline et al. |

(Continued)

OTHER PUBLICATIONS

IBM: "SQL Reference" IBM Db2 Database Version 7.: Online information (aka Db2 Universal Database Version 7) 2 pages.*

(Continued)

*Primary Examiner*—Greta L. Robinson
*Assistant Examiner*—Jacques Veillard
(74) *Attorney, Agent, or Firm*—Bingham McCutchen LLP

(57) ABSTRACT

A method and mechanism for pipelined table functions is disclosed. With pipelining, data from a first table function does not have to be materialized into a complete collection before it is consumed by a succeeding table function. Instead, a producer of data creates a stream of data that is immediately utilized by a consumer of that data. Also disclosed is a method and mechanism for parallel processing of table functions, in which the set of work operated upon by a table function is sub-divided into smaller portions that are assigned to a plurality of table function slaves. Also disclosed is an integration between pipelining and parallelized execution for table functions.

43 Claims, 15 Drawing Sheets

U.S. PATENT DOCUMENTS

| | | | |
|---|---|---|---|
| 5,812,852 A * | 9/1998 | Poulsen et al. | 717/149 |
| 5,813,000 A | 9/1998 | Furlani | |
| 5,815,718 A * | 9/1998 | Tock | 717/166 |
| 5,819,268 A | 10/1998 | Hackett | |
| 5,822,749 A | 10/1998 | Agarwal | |
| 5,822,790 A | 10/1998 | Mehrotra | |
| 5,826,253 A | 10/1998 | Bredenberg | |
| 5,832,231 A | 11/1998 | Raman et al. | |
| 5,835,755 A | 11/1998 | Stellwagen, Jr. | |
| 5,835,904 A | 11/1998 | Vicik et al. | |
| 5,875,296 A | 2/1999 | Shi et al. | |
| 5,913,025 A | 6/1999 | Higley et al. | |
| 5,913,208 A | 6/1999 | Brown et al. | |
| 5,930,795 A * | 7/1999 | Chen et al. | 707/100 |
| 5,937,415 A * | 8/1999 | Sheffield et al. | 707/204 |
| 5,937,421 A | 8/1999 | Petrov et al. | |
| 5,958,040 A | 9/1999 | Jouppi | |
| 6,009,265 A * | 12/1999 | Huang et al. | 707/3 |
| 6,021,407 A | 2/2000 | Meck et al. | |
| 6,023,684 A | 2/2000 | Pearson | |
| 6,052,699 A * | 4/2000 | Huelsbergen et al. | 707/206 |
| 6,052,785 A | 4/2000 | Lin et al. | |
| 6,067,623 A | 5/2000 | Blakley, III et al. | |
| 6,076,092 A | 6/2000 | Goldberg et al. | |
| 6,098,064 A | 8/2000 | Pirolli et al. | |
| 6,112,197 A | 8/2000 | Chatterjee et al. | |
| 6,112,209 A * | 8/2000 | Gusack | 707/101 |
| 6,115,040 A | 9/2000 | Bladow et al. | |
| 6,134,594 A | 10/2000 | Helland et al. | |
| 6,141,759 A | 10/2000 | Braddy | |
| 6,151,602 A | 11/2000 | Hejlsberg et al. | |
| 6,178,461 B1 | 1/2001 | Chan et al. | |
| 6,286,104 B1 | 9/2001 | Buhle et al. | |
| 6,341,288 B1 | 1/2002 | Yach et al. | |
| 6,401,193 B1 | 6/2002 | Afsar et al. | |
| 6,421,342 B1 * | 7/2002 | Schwartz et al. | 370/392 |
| 6,421,715 B1 | 7/2002 | Chatterjee et al. | |
| 6,430,618 B1 | 8/2002 | Karger et al. | |
| 6,463,508 B1 | 10/2002 | Wolf et al. | |
| 6,484,179 B1 | 11/2002 | Roccaforte | |
| 6,505,187 B1 * | 1/2003 | Shatdal | 707/2 |
| 6,507,834 B1 * | 1/2003 | Kabra et al. | 707/2 |
| 6,513,108 B1 | 1/2003 | Kerr et al. | |
| 6,557,079 B1 | 4/2003 | Mason, Jr. et al. | |
| 6,598,037 B1 | 7/2003 | Craig et al. | |
| 6,618,729 B1 | 9/2003 | Bhashyam et al. | |
| 6,629,123 B1 | 9/2003 | Hunt | |
| 6,662,218 B1 | 12/2003 | Mighdoll et al. | |
| 6,665,684 B1 | 12/2003 | Zait et al. | |
| 6,675,195 B1 | 1/2004 | Chatterjee et al. | |
| 6,701,520 B1 * | 3/2004 | Santosuosso et al. | 717/152 |
| 6,763,382 B1 | 7/2004 | Balakrishnan et al. | |
| 2001/0003823 A1 | 6/2001 | Mighdoll et al. | |
| 2001/0013045 A1 | 8/2001 | Loschky et al. | |
| 2001/0051956 A1 | 12/2001 | Bird | |
| 2002/0099806 A1 | 7/2002 | Balsamo et al. | |
| 2002/0143728 A1 | 10/2002 | Colner et al. | |
| 2002/0194174 A1 | 12/2002 | Calkins et al. | |

OTHER PUBLICATIONS

Padmanabhan et al. "Using Predictive Prefetching to Improve World Wide Web Latency" *Proceedings of the ACM SIGCOMM '96 Conference* (1996) pp. 1-15.

IBM "SQL Reference" IBM DB2 Database Version 7: Online Information (aka DB2 Universal Database Version 7) (2003), 2 pgs., located at: http://publib.boulder.ibm.com/Infocenter/db2v7luw/index.jsp?topic=/com.ibm.db2v7.doc.db2s0/funcdef.htm.

Partnerworld for Developers "What is the new Table Function?" IBM PartnerWorld for Developers Frequently Asked Questions (Sep. 9, 2002), 1 pg., located at: http://www.developer.ibm.com/tech/faq/individual?oid=2:12255 (this FQA question and answer no longer avail. online or in FAQs database).

IBM "Create Function (External Table)" IBM DB2 Universal Database Version 7: Online Information (2003), 12 pgs., the older version is no longer available in IBM website; the latest version of DB2 Universal Database related to Create Function (External Table) is located at http://publib.boulder.ibm.com/infocenter/db2v7luw/index.jsp?topic=/com.ibm.db2v7.doc.db2s0/crfnoldb.htm.

The PostgreSQL Global Development Group "9.7 Table Functions" PostgreSQL 7.3.7 Programmer's Guide, 2 pgs., located at: Chapter Postgre 7.3.7 documentation no longer existed in Postgre website, but has been archived at http://doc.rz.ifi.lmu.de/server/pg/7.3/ (Chapter 7.3.8 documentation is the latest version) http://www.postgresql.org/docs/7.3/static/xfunc-tablefunctions.html, (no date).

The PostgreSQL Global Development Group "Select" PostgreSQL 7.3.7 Programmer's Guide, 17 pgs., located at: Chapter Postgre 7.3.7 documentation no longer existed in Postgre website, but has been archived at http://doc.rz.ifi.lmu.de/server/pg/7.3/ (Chapter 7.3.8 documentation is the latest version) http://www.postgresql.org/docs/7.3/static/sql-select.html, (no date).

Jaedicke, M. and B. Mitschang "On Parallel Processing of Aggregate and Scalar Functions in Object Relational DBMS" *ACM* (1996) pp. 379.389.

* cited by examiner

METHOD AND SYSTEM FOR PIPELINED DATABASE TABLE FUNCTIONS

BACKGROUND AND SUMMARY

In a database management system, a function or procedure is a set of statements in a procedural language (e.g., PL/SQL, C, or Java) that is executed as a unit to solve a specific problem or perform a set of related tasks. A function generally differs from a procedure in that the function returns a value to the environment in which it is called. Many database management systems permit users to create and call "table functions" which are a class of functions that produces a set of rows or data objects as output. Table functions can be viewed as a "virtual table" and may be used in the context of a FROM clause (a construct in the database query language SQL) to iterate over individual rows. Further, other SQL or database operations such as selection (e.g., WHERE clause) or aggregation (e.g., GROUP BY clause) can be performed on these rows.

One reason to utilize table functions is to allow users to implement new functions that perform complex transformations on a set of rows or which generates a set of rows, and which are not pre-existing or pre-defined system functions. Another reason for utilizing table functions is to allow users to define functions that operate upon non-native object types in a database system. Non-native object types may be created, for example, using the "CREATE TYPE" command in the Oracle 8i database management system from Oracle Corporation of Redwood Shores, Calif.

FIG. 1 depicts one approach to implementing tables functions in the context of an ETL (Extraction-Transformation-Load) process for data warehousing. The ETL process extracts data from an online transaction processing (OLTP) system 102, performs a sequence of transformations upon the extracted data, and thereafter loads that transformed data into a data warehouse 108. The transformation steps can be performed by table functions, such as table functions 104 and 106 as shown in FIG. 1. In conventional database systems, a table function cannot accept a pipelined stream of input data; thus, data is usually "staged" before being fed to a table function. In the approach of FIG. 1, the output of a first table function 104 is staged into stage 105 before it is processed by the immediately following table function 106. In effect, the entire output of table function 104 is materialized, possibly into a table or "collection type" instance, before the next transformation table function 106 receives any input data to begin its processing. A collection type describes a data unit made up of a number of elements having a particular data/object type.

Staging forms a blocking operation that presents a significant source of expense and inefficiency to the database system. If the entire output of a first transformation must be materialized before it is passed to the next transformation, excessive memory and/or disk requirements may be imposed because of the staging. Moreover, the overall response time of the ETL operation is affected because each downstream table function remains idle until its corresponding upstream table function has completely constructed the entire set of data that it is to produce. If there is a chain of table functions in the ETL process with staging between each intermediate transformation, then multiple levels of stage-based delays will be imposed. Note that this problem is not limited solely to ETL processes, but exists for many other types of database processes utilizing table functions and staging.

One embodiment of the present invention addresses this problem by implementing input pipelining for table functions. With input pipelining, data does not have to be completely materialized before it is consumed by a table function. Instead, in one embodiment, a producer of data creates a stream of data that is immediately utilized by a table function consumer of that data. This permits a chain of table functions in which a producer table function generates a pipelined output of data, which is consumed by a consumer table function that accepts a pipelined input of the data. Another aspect of an embodiment is directed to parallel processing of table functions, in which the set of work operated upon by a table function is sub-divided into smaller portions that are assigned to a plurality of database execution slaves. Yet another aspect of an embodiment of the invention is an integration between pipelining and parallelized execution for table functions.

BRIEF DESCRIPTION OF THE DRAWINGS

The accompanying drawings are included to provide a further understanding of the invention and, together with the Detailed Description, serve to explain the principles of the invention.

DETAILED DESCRIPTION OF EMBODIMENT(S)

Pipelined Table Functions

The invention, according to an embodiment, is directed to a system and method for pipelining data into a table function. With input pipelining, data does not have to be materialized completely into a table or collection before it is consumed by a table function. Instead, a producer of data (e.g., a table function or any other source of data) creates a stream of data that is immediately utilized by a table function consumer of that data. Thus, in one embodiment of the invention, a table function can accept one or more streams of rows as input. The rows can be fetched from the one or more input streams on-demand by the table function. In addition, results can be pipelined out of the functions. This enables table functions to be nested or chained together. Further, table functions can be parallelized by partitioning an input stream based on user-defined criteria. This enables table functions to become data transformation entities rather than just data generation units, accepting a streamed data input and transforming it using complex user-defined logic.

The presently disclosed table functions with support for pipelining, streaming, and parallelism represent a new paradigm in solving complex transformation problems inside a database server. The following are some of the benefits offered by such table functions. First, the disclosed table function technology facilitates closer integration of application-specific transformations with the database engine. This is possible because pipelined table functions allow moving compute- and data-intensive user-defined logic from front-end or middle-tier tools into the scalable database server. Second, they help in enabling and speeding up already existing extensible components inside the database, such as spatial joins and text indexing by parallelizing and pipelining table functions. Third, pipelined table functions allow transformation logic and its related complexity to be pushed into the scalable back-end server such that applications become more "database-centric", thereby reducing the complexity of front- and middle-tier tools.

Figure 1:
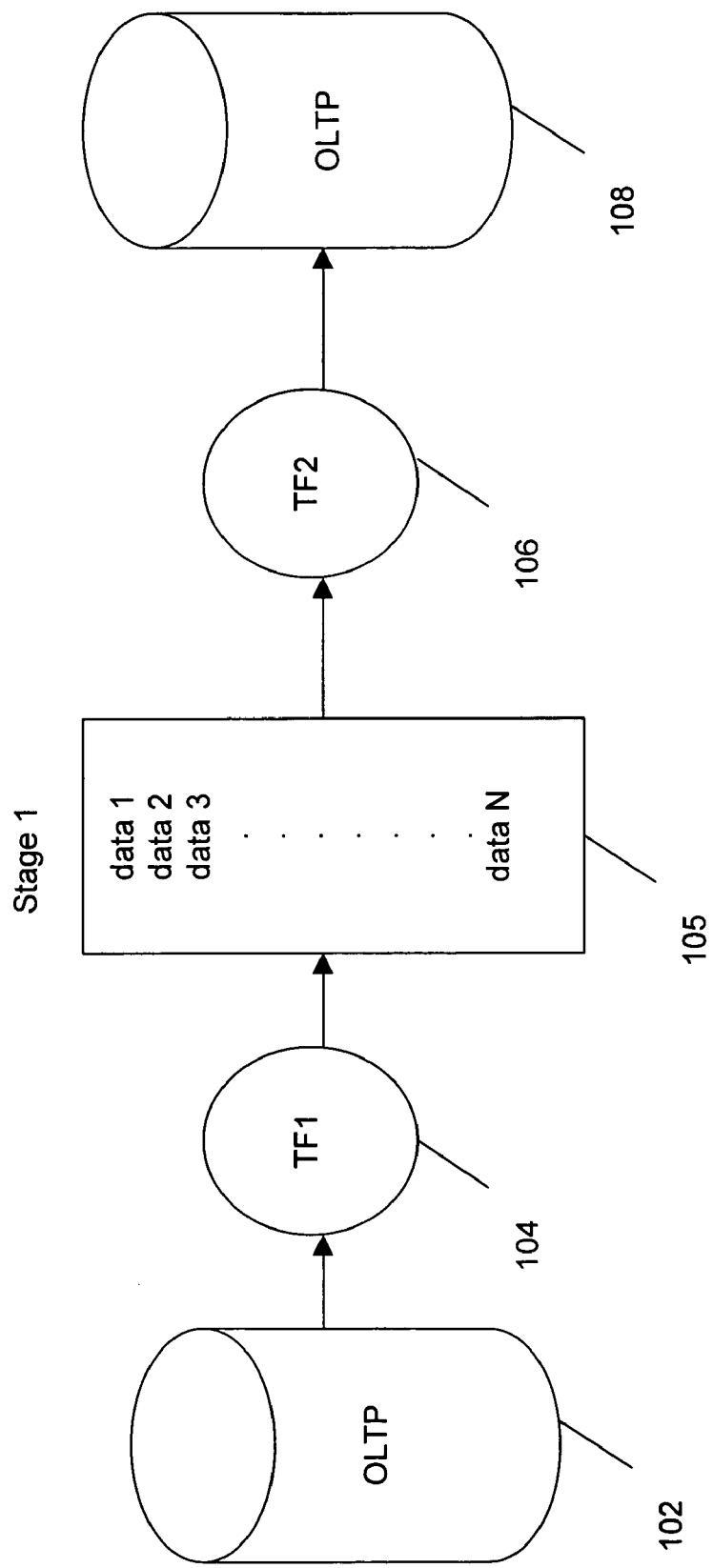
FIG. 1 depicts an ETL process in which staging occurs between transformations.
Figure 2:
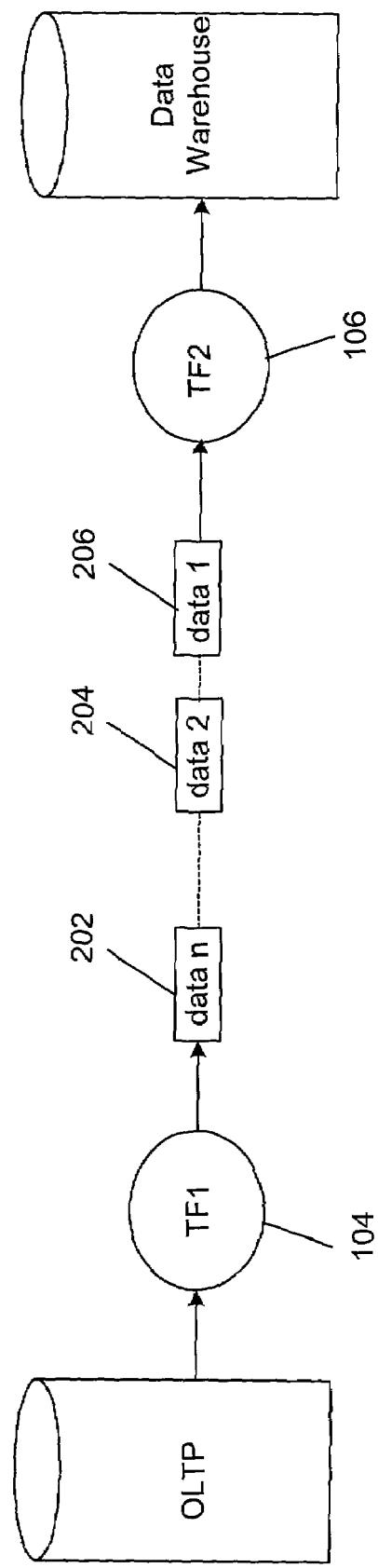
FIG. 2 depicts an ETL process in which data is pipelined between transformations.

Input pipelining for table functions permits a first table function to directly pipeline a stream of data to a second table function. This aspect of the invention is shown in FIG. 2, in which a stream of data subsets 202, 204, and 206 are sent from a first table function 104 ("producer") to a second table function 106 ("consumer"). The second table function 106 can therefore process each data subset, consisting of one or more data objects or rows, as it is streamed from table function 104, thereby avoiding excess wait time and memory consumption expenses as required by the staging approach shown in FIG. 1.

According to one embodiment of the invention, one or more iterators are employed to execute a database statement. An iterator is a mechanism for retrieving rows of data from a database. Associated with each iterator are start, fetch, and close methods. Examples of iterator nodes include table scans, joins, union, etc. Iterator nodes are combined together in a tree that implements a query execution plan based on costing decisions made by an optimizer. At execution time, the execution plan is evaluated in a demand-driven fashion, by fetching the required number of rows from the root node of the iterator tree. In an embodiment of the invention, a table function is internally represented as an iterator in the query execution plan.

Database query language statements, e.g. procedural language statements such as PL/SQL programs, are compiled into machine-independent bytecode in one embodiment of the invention. The bytecode instructions are executed by a PL/SQL Virtual Machine (PVM) at runtime. A PL/SQL engine maintains an execution context for every instantiation of the PVM. A new instance is created for every invocation of the function. Information like register values, embedded SQL statements, exceptions etc. are stored in the execution context.

In an embodiment, two mechanisms are provided for implementing pipelined table functions. A first approach is referred to as the interface approach. A second approach is referred to as the native database approach. Each of these approaches are described in more detail below.

The interface approach provides flexibility by allowing a table function to be implemented in any procedural language supported by a database system. According to the interface approach, an interface is defined for the creation and pipelined/repeated invocations of table functions and object types having recognized invocations for pipelining. In an embodiment, the interface comprises "Start", "Stop", and "Fetch" interfaces that are embedded into the definition of an object type. The exact contents of these interface routines are specifiable by a user or object type creator to implement desired pipelining functionality. The object type is associated with a table function that is pipeline enabled. When a pipelined table function is executed, the database server accesses these pipelining routines for associated object types at appropriate times to execute the pipelined table function(s). Thus, each object type associated with the pipelining operation corresponds to a set of pipelining routines that define a set of pipelining parameters. The following is example pseudocode for an object type definition under this approach:

```
CREATE TYPE new_object AS OBJECT
(
  object definition statements;/* to define parameters of new object type */
  start ( args ) /* statements to define start routine */
    start routine statements;
  fetch ( args ) /* statements to define fetch routine */
    fetch routine statements;
  stop ( args ) /* statements to define stop routine */
    stop routine statements;
);
```

In this pseudocode, "new_object" is the name of a new object type, and start(args), fetch(args), and stop(args) refer to start, fetch, and stop command routines respectively.

Figure 3:
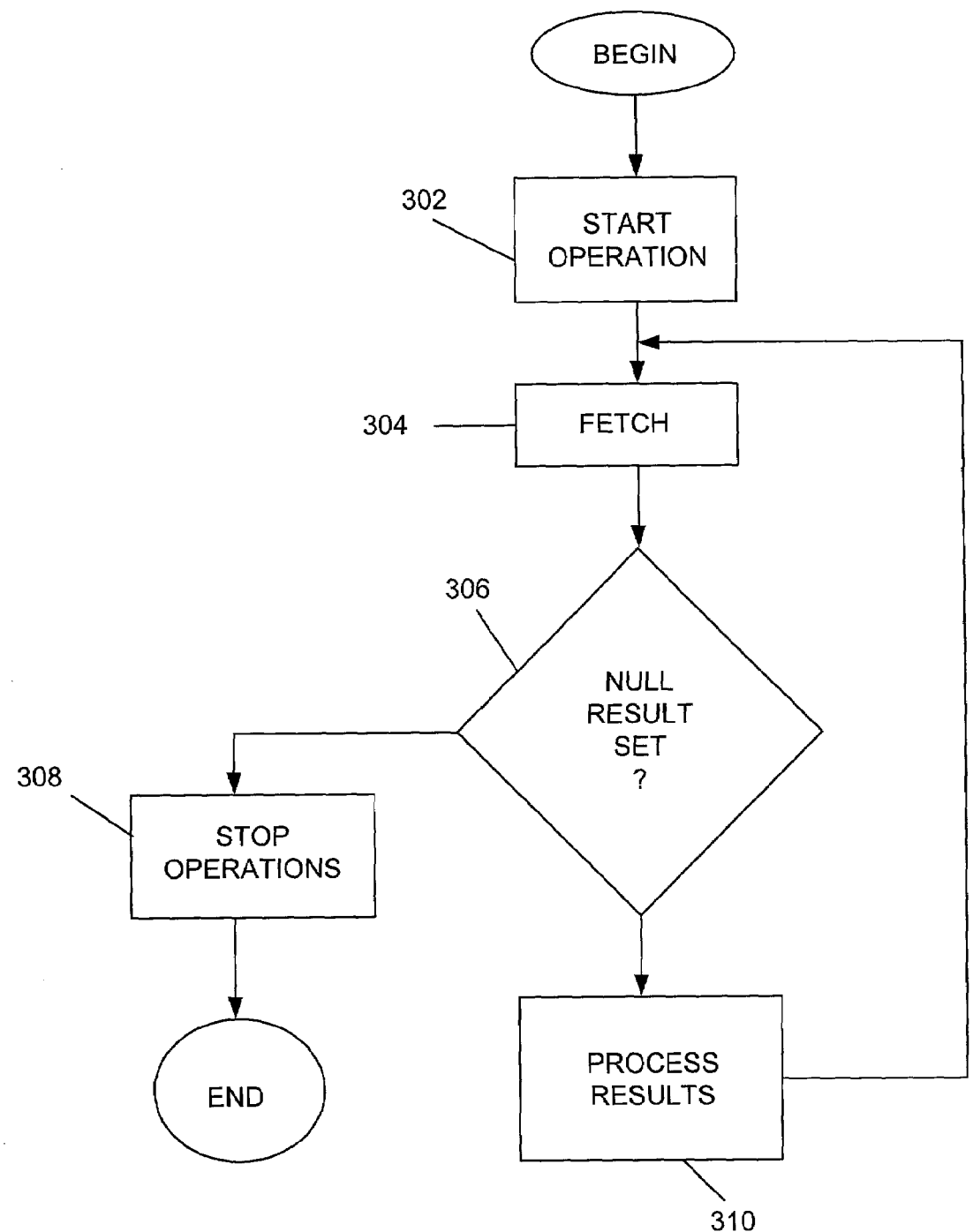
FIG. 3 shows a flowchart of a process for pipelining according to an embodiment of the invention.

FIG. 3 depicts a process flow for pipelining according to an embodiment of the interface approach. When a pipelined table function is called, the "start" routine for an associated object type is invoked (302). This start routine comprises one or more statements to perform setup operations required for the pipelining. For example, a context object (or "scan context") can be created and returned to the database server as part of the start routine to maintain state information for the pipelined table function. In an embodiment, the context object is an instance of an object type that models the context to be preserved between successive invocations of the interface routines. Any other desired preliminary operations to setup or prepare the system/data for pipelining can be implemented using the start routine. The following represents an example declaration for a start routine:

```
STATIC FUNCTION TABLESTART ( context_object OUT
<scan_context_type>, <args>)
  RETURN return_type;
```

In this example declaration, "context_object" represents the scan context object set up by the start routine and "args" represents any additional arguments to be passed to the start routine. The scan context holds the computation state between invocations of the interface routines. It can also be an identifier or a key to a real context that is stored out-of-line.

The database server thereafter invokes the "fetch" routine for the object type to retrieve data produced by the table function (304). The fetch routine for an object type defines the parameters relating to the retrieval and output of data from a pipelined table function that operates upon that object type. For example, the fetch routine defines the quantity of data to retrieve for each fetch invocation. In effect, the fetch routine defines the "degree" of streaming that is performed by a pipelined table function.

The fetch routine returns specified subsets of data consisting of one or more data objects or rows of data. The following is an example of a fetch declaration according to an embodiment of the invention:

MEMBER FUNCTION TABLEFETCH (context_object OUT <scan_context_type>, rows_out OUT <coll-type>) RETURN NUMBER;

In this example declaration, "rows_out" refers to the data fetched by each invocation of the fetch routine and "context_object" refers to the scan context.

The context object created by the start routine is passed as a parameter to the fetch routine. The context object is updated after each fetch invocation to indicate the state of the pipelined table function. If the size of the scan context is large, it may degrade performance due to parameter passing overheads. In such scenarios, it is useful to store the scan context out-of-line, in which the actual scan context resides in the execution environment of the table function and only a handle to the context (e.g., a logical pointer) is passed back and forth.

The fetch routine is repeatedly called until all the data to be outputted by a table function has been returned. According to an embodiment, an end-of-data marker, e.g., a NULL value, is returned if there remains no more data to be returned by the table function. If the result set returned by the fetch routine is not NULL (306), then the returned data is processed by the database server or consumer (310), and another fetch operation is again iteratively performed to retrieve more data (304). If the result set is NULL, then there is no more data to retrieve and close operations are performed (308).

The number of rows returned for each invocation of the fetch routine can be modified to optimize the table function process. A trade-off between response time and throughput exists with respect to the batch size for results returned from the fetch routine. If a smaller batch size is used, then a faster response time is obtained to fetch an initial set of results. However, smaller batch sizes result a larger number of calls to the fetch routine. Since there may be non-trivial overhead associated with invoking the fetch routine (e.g., if it is implemented as a foreign function), increasing the number of fetch calls may result in greater total execution time. Returning more rows in each invocation of the fetch routine by increasing the batch size reduces the number of fetch calls that must be made, which could improve overall execution times. However, the more rows returned for each fetch, the more delay is imposed before retrieved data is sent to a consumer of the data, causing a slower immediate response time. Larger batch sizes may also lead to increased resource utilization (such as memory resources), thereby degrading scalability. The optimal batch size for a particular application depends upon a variety of factors including the nature of processing within the table function (e.g., CPU intensive or disk intensive), availability of resources (e.g., memory), the cost of function invocation, and the need for good response time versus the need for improved throughput. One approach for optimizing the batch size is to begin with an initial batch size (e.g., 100 rows), and perform experiments on typical workloads to arrive at an appropriately optimal batch size.

Figure 4:
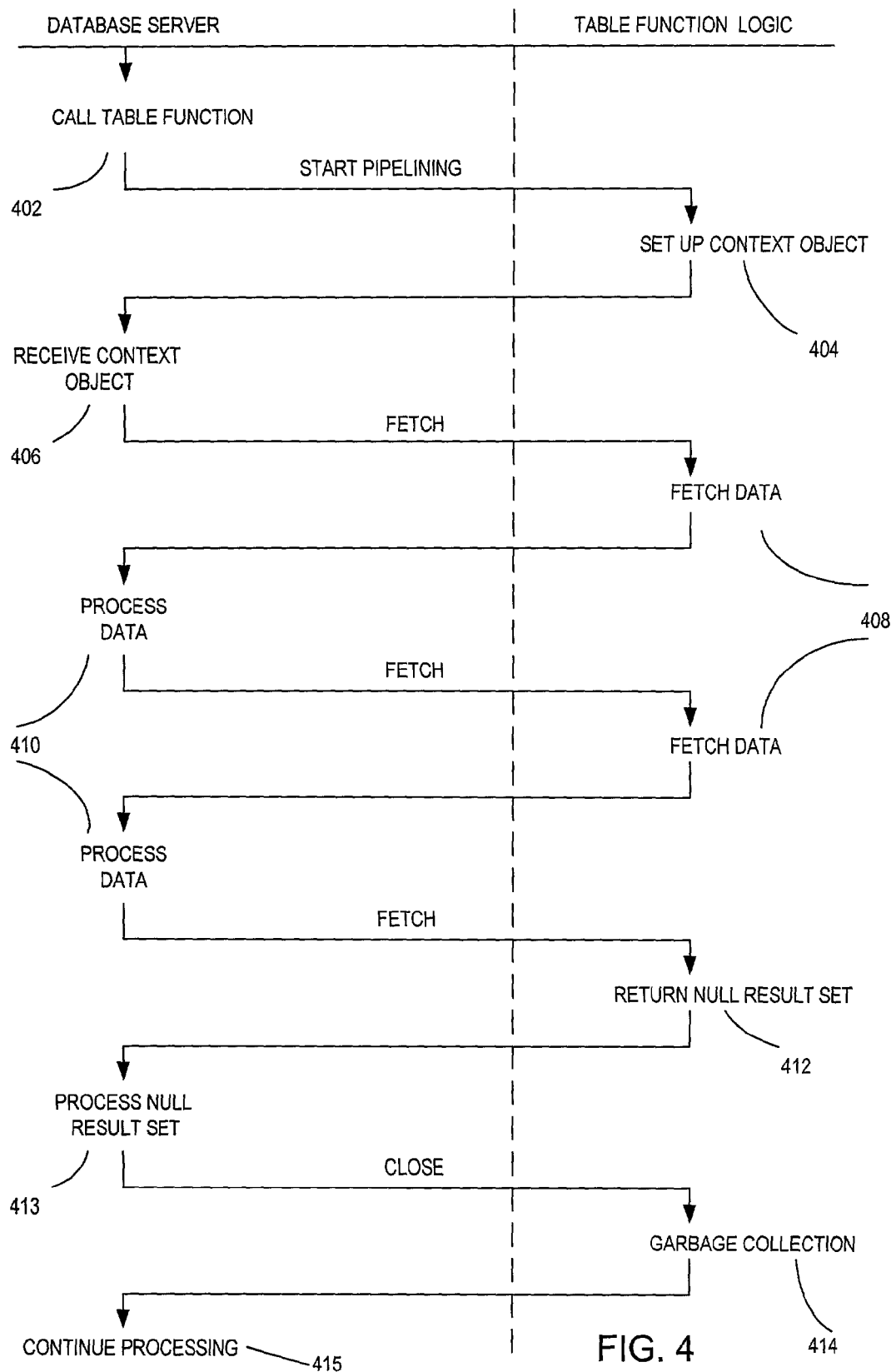
FIG. 4 shows the flow of control for a pipelining process according to an embodiment of the invention.

Stop operations are executed after completion of the last fetch operation based upon invocation of a "stop" routine for a corresponding object type. The stop routine performs any necessary cleanup operations for the pipelining, such as performing any needed garbage collection for the context object created by the start routine. The following is an example of a stop declaration according to an embodiment of the invention:

MEMBER FUNCTION TABLESTOP (context_object IN <scan_context_type>) RETURN NUMBER;

FIG. 4 pictorially depicts the flow of control when executing a pipelined table function according to the interface approach in an embodiment of the invention. The process begins when the database server calls a pipeline-enabled table function (402). The table function logic performs any required set-up operations (404) and returns a context object for the function to the database server (406). Fetch operations are iteratively performed as needed to retrieve data generated by the table function (408). Each subset of data is returned to the database server (410). The data may be transferred from the database server to a downstream consumer of data for further processing.

According to the embodiment shown in FIG. 4, processing by the table function logic is halted until the database server makes a next fetch invocation. In this approach, both the producer (e.g., an upstream table function) and consumer of data (e.g., a downstream table function) run on the same execution thread. Producer explicitly returns control back to consumer after producing a set of results. When the consumer is ready for more data, control is returned back to the producer via the fetch invocation. Producer caches the current state (e.g., in a context object) so that it can resume its operations when invoked again by the consumer. According to an alternate embodiment, the table function continues to generate data in parallel to the processing by consumer, but does not send additional data to the database server until a next fetch call is received. In this approach, both the consumer and producer of data run on separate execution threads and could be on either the same or separate process context. Communications between the consumer and producer of data can be performed, for example, through a pipe or queue mechanism.

Once all the data has been fetched, an end-of-data marker, e.g. a NULL value, is returned to the database server (412). The database server received the NULL marker (413) and thereafter invokes any close operations needed to clean up the pipelining operation (414). The database server thereafter continues its processing (415).

In an embodiment, the consumer of data can pass a callback function to the producer which is executed for each row or data object produced. In this approach, instead of the consumer returning control to the producer, it can call the producer and provide a callback function. The producer then invokes the callback function for each produced row.

According to an embodiment, a table function that implements pipelining is declaratively identified as a pipelined enabled function. The following is an example of a possible declaration that can be employed:

```
CREATE FUNCTION function_id
    { Function body and additional declarations}
    PIPELINED USING object_type;
```

Note that any declaration syntax can be utilized within the scope of the invention such that a database system is notified of the existence of a pipelined table function, and the invention is not limited to any specific declaration examples shown herein. This is also true of other declaration examples shown throughout this document, e.g., for the start, fetch, and stop routines, which can likewise be implemented using other declaration syntax.

The following is an illustrative example of table function declaration pseudocode using the interface approach to convert a row of the type (Ticker, Openprice, Closeprice) into two rows of the form (Ticker, PriceType, Price). So the row ("ORCL", 41, 42) would generates two rows ("ORCL", "O", 41) and ("ORCL", "C", 42).

```
CREATE TYPE BODY StockPivotImpl IS
    -- START routine
    static function Start(sctx OUT StockPivotImpl, p InputCursorType)
    return number is
    begin
        sctx.cur := p; -- save ref cursor in scan context
        return Success; --success code
    end;
    -- FETCH routine
    member function Fetch(outrows OUT TickerTypeSet)return number is
    in_rec StockTable%ROWTYPE;
    idx integer := 1;
    begin
        outrows.extend(100); -- we have chosen to return 100 rows at a time
        while (idx <= 100) loop
            fetch self.cur into in_rec;
            -- first row
            outrows(idx).ticker := in_rec.Ticker;
            outrows(idx).PriceType := "O";
            outrows(idx).price := in_rec.OpenPrice;
            -- second row
            idx := idx + 1;
            outrows(idx).ticker in_rec.Ticker;
            outrows(idx).PriceType := "C";
            outrows(idx).price := in_rec.ClosePrice;
            idx := idx + 1;
        end loop;
        return Success;
    end;
    -- CLOSE routine (no action required)
    member function Close return number is
        begin
            return Success;
        end;
end; -- end of type body
```

Figure 5:
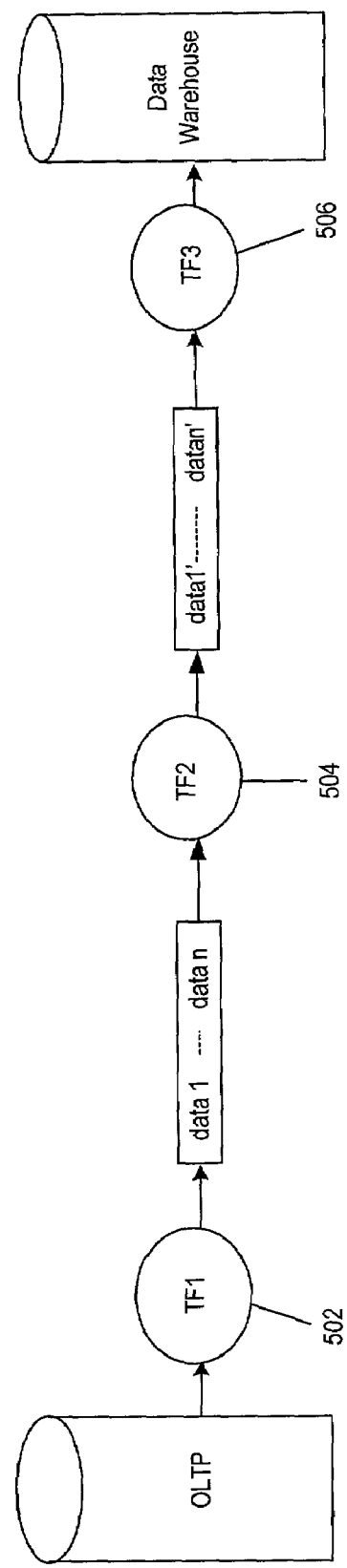
FIG. 5 depicts chained pipelining according to an embodiment of the invention.

The disclosed embodiment of the present pipelining process obviates the need for staging data between successive table functions, such as the series of transformations performed during an ETL process. Consistent with one embodiment of the invention, data is consumed by a downstream table function immediately after it is produced by an upstream table function. Since table functions can therefore be symmetrical in both accepting and returning rows of data, table functions can be nested together to form chains of transformations. FIG. 5 illustrates chained pipelining of table functions according to one embodiment of the invention. In FIG. 5, the data output of a first table function 502 is streamed as input into a second table function 504. The data output of the second table function 504 is streamed as input into a third table function 506. An indefinitely long chain of pipelined table functions is thus supportable using the present invention.

A second approach to pipelining is referred to as the native database language approach. In this approach, a native mechanism for pipelining is supported from within a database query language or procedural database query language (such as PL/SQL available from Oracle Corporation or Redwood Shores, Calif.). The native mechanism comprises a recognized command statement that is placed within a pipelined table function. For example, such a command statement could be called a "PIPE" command statement. The following is an example of pseudocode in a procedural database query language for declaring a pipelined table function under this approach:

```
CREATE FUNCTION native_approach (args) RETURN out_data_type
PIPELINED IS data_out out_data_type;
BEGIN
    FOR in_record IN p LOOP
        processing statements;
        PIPE data_out;
END;
```

The FOR loop in this example can also be represented using the following WHILE loop:

```
WHILE (condition TRUE LOOP processing statements;
    PIPE ROW (data-out) processing statements;)
END WHILE
```

In this example pseudocode, the PIPE statement pipelines data (i.e., data_out) out of the table function when it is encountered during execution. In an embodiment, this approach is implemented by allowing both the consumer and producer of data to share the same execution thread. Producer maintains control of the execution thread when it is producing data for output and the producer explicitly gives control to a consumer after producing a set of results. Consumer also explicitly returns control back to the producer when it desires additional data. In operation, a database execution engine, e.g., a SQL engine, takes control when there is a need to retrieve more data from the table function. A database query language interpreter, e.g., a PL/SQL interpreter, takes control after the database execution engine produces a set of data. Control passes from the interpreter to the execution engine until the PIPE command is encountered. The SQL engine consumes the rows and then resumes execution of the PL/SQL interpreter. This procedure continues until all rows are consumed. Similar to the interface approach, a consumer may pass a callback function to the producer to directly execute an operation for each retrieved row of data.

For performance reasons, the database system may batch several rows before providing the output data to a consumer. Alternatively, the consumer can set the number of rows that are output for each PIPE statement. In one embodiment, pipelined table functions have return statements that do not return any values. The return statement can be used to transfer control back to the consumer, to ensure that end-of-data situations are recognized.

The following represents the native database approach to the StockPivot table function set forth above using a procedural database query language (e.g., PL/SQL):

create function StockPivot(p InputCurType) return TickerTypeSet

```
pipelined is
    in_rec InputRecType;
    out_rec TickerType;
begin
    for in_rec in p loop
        FETCH p into in_rec;
        EXIT when p = "NOTFOUND"; --exit when no more rows
        -- first row
        out_rec.ticker := in_rec.Ticker;
        out_rec.PriceType := "O";
        out_rec.price := in_rec.OpenPrice;
        PIPE row(out_rec);
        -- second row
        out_rec.PriceType := "C";
        out_rec.Price := in_rec.ClosePrice;
        PIPE row(out_rec);
    end loop;
    return;
end;
```

In this example, "InputCurType" corresponds to a ref cursor type. Ref cursors are used by database programming languages to represent a set of rows. These rows can be fetched using the FETCH command.

Under either the interface or native implementation approach, pipelined table functions can be integrated into ordinary database queries (e.g., SQL queries) according to the invention. For example, pipelined table functions can be used in the FROM clause of SQL SELECT statements. As described above, data is iteratively retrieved from a table function as if it is being fetched from an arbitrary query block and can be transparently passed to a consumer of data by the database server. Thus, pipelined table function effectively appears to a database query like any other source of rows or data. Integration of pipelining into standard database query language statements, pursuant to one embodiment of the present invention, allows all the advantages and optimizations that may be applied to any standard query in the database system to be applied to such pipelined statements. For example, standard query optimizations, such as selection of less-expensive execution plan and/or optimized joins, may be applied to optimize the execution of queries comprising pipelined tabled function. Relevant statistics, e.g., cardinality, selectivity, and cost estimation values, may be supplied to an optimizer. These statistics can be invoked by the optimizer to compute the cost of the table functions, allowing the optimizer to generate optimal query plans for queries involving the table functions. Alternatively the optimizer can guess the cardinality (i.e., number of rows) of the table functions and their selectivities with respect to the query predicates.

As another example of integrating pipelined table functions with SQL queries, consider the following SQL statement that pipelines from a table function to SQL (this example references the above StockPivot table function):

```
select * from
    table(StockPivot(select * from StockTable));
```

To implement this type of integration according to an embodiment of the invention, a callback function is passed by the query node corresponding to the outer SQL query. In the native language approach, the "PIPE row(out-rec);" statement will then invoke the callback for each row produced. In the interface approach, each "fetch" invocation will execute the callback. For example:

```
select * from
    table(StockPivot(select * from StockTable)) x
    where x.PriceType = 'C';
```

The callback function passed to 'StockPivot' corresponds to the filter "x.PriceType='C'". Function 'StockPivot' invokes the filter for each produced row; this helps the producer to eliminate the inappropriate rows without returning them to the consumer. Based on the above-mentioned execution mechanism, rows selected by the query

```
select * from table(StockPivot( . . . )) where . . . ;
``` are displayed as soon as they are produced. In addition, this will benefit statements that pipelined the results from inner sub-query to outer SQL statements:

```
insert into tab select * from table(StockPivot( . . . )) where . . . ;
```

Under certain circumstances, it may be difficult to define the structure of the return type from the table function statically. For example, the structure and form of rows and data objects may be different in different queries and may depend on the actual arguments with which the table function is invoked. Thus, these circumstances make it difficult to know the return type prior to compilation of the table function. According to an embodiment, this issue is addressed by use of dynamic metadata and datatypes to define the return type of a table function.

Under this approach, the return type of a table function is defined using an extensible and definable datatype that can be used to model a collection of data for any returnable or anticipates element or object type. Thus, the table function is declared to return data/collection whose structure is not fixed at function creation time. An exemplary approach to implementing dynamically definable datatypes is disclosed in co-pending U.S. application Ser. No. 09/938,999, entitled "Method and Mechanism for Storing and Managing Self-descriptive Heterogeneous Data," filed on Aug. 24, 2001 and issued on Jun. 8, 2004 as U.S. Pat. No. 6,748,388, which is hereby incorporated.

Since the format of the element may depend on the actual parameters to the table function, the invention provides a Describe interface implemented by the user can be employed in one embodiment of the invention. The database server invokes the Describe routine at query compilation time to retrieve the specific type information for the table function. The Describe routine uses user arguments to determine the shape of the return rows. The format of elements within the returned collection is conveyed to the database server by returning an instance of a datatype to model the metadata of a row. The following is the signature of an example Describe routine:

```
STATIC FUNCTION TableDescribe(rtype OUT ANYTYPE, <args>)
    RETURN NUMBER;
```

To illustrate this aspect of the invention, consider the following table function definition:

```
CREATE FUNCTION AnyDocuments(VARCHAR) RETURN
ANYDATASET PIPELINED USING DocumentMethods;
```

Consider if the following query is placed against the table function:

```
SELECT * FROM
    TABLE(AnyDocuments('http:1/ . . . /documents.xml')) x
    WHERE x.Abstract like '%internet%';
```

Consistent with an embodiment of the invention, the database server invokes the Describe routine at compilation time to determine the return type of the table function. In this example, the DTD of the XML documents at the specified location is consulted and the appropriate AnyType value is returned. The AnyType instance is constructed by invoking the constructor APIs with the field name and datatype information. For the sake of illustration, suppose that the table function could return information on either books or magazines. An example implementation of the Describe routine is as follows:

```
CREATE TYPE Mag_t AS OBJECT
( name VARCHAR(100),
publisher VARCHAR(30),
abstract VARCHAR(1000)
);
STATIC FUNCTION TableDescribe(rtype OUT ANYTYPE,
url VARCHAR)
IS BEGIN
Contact specified web server and retrieve document . . .
Check XML doc schema to determine if books or mags . . .
IF books THEN
        rtype=AnyType.AnyTypeGetPersistent('SYS', 'BOOK_T');
ELSE
        rtype=AnyType.AnyTypeGetPersistent('SYS', 'MAG_T');
END IF;
END;
```

As mentioned above, during query compilation time, the database server invokes the Describe method and uses the type information (returned via the AnyType out argument) to resolve references in the command line, such as the reference to the "x.Abstract" attribute in the query above. This functionality is particularly applicable when the returned type is a named type, and therefore has named attributes.

Another use of this feature is the ability to describe select list parameters when executing a "select *" query. The information retrieved reflects one select list item for each top level attribute of the type returned by the Describe routine.

Since the Describe method can be called at compile time, the table function in an embodiment has at least one argument which has a value at compile time (e.g. a constant). By using the table function with different arguments, different return types are possible from the function. For example:

```
-- Issue a query for books
SELECT x.Name, x.Author
FROM TABLE(AnyDocuments('Books xml')) x;
-- Issue a query for magazines
SELECT x.Name, x.Publisher
FROM TABLE(AnyDocuments('Magazines.xml')) x;
```

Parallelizing Table Functions

The present invention, according to one embodiment, also provides a method and mechanism for parallelizing the execution of table functions. When a table function is executed in parallel, the set of data operated upon by the table function is subdivided into smaller portions to be administered by separate executing entities, such as threads, processes, servers or tasks. These processing entities are referred to herein as "slaves." In many cases, it is highly desirable or even necessary to ensure that the set of work is logically subdivided in a manner that matches the functional characteristics of the tables function, the type(s) of data input/output by the table function, and/or the degree of parallelism configured for the table function. The choice of "partitioning" criteria for subdividing work depends on the logic encoded in the function body, and not all partitioning will produce the correct results for all table functions. In one embodiment, the runtime system should ensure that all data rows/objects with the same partitioned values are handled by the same slave.

As noted above, table functions are often user-defined functions having functionality that is not native to a default database system. Thus, knowledge about the internal operations, behavior, and functionality of table functions are typically more complete for creators of the table function than those that merely invoke or call table functions. In many database systems, a table function appears as a "black box" to the database system, with internal details not completely known or recognized by the database system. Thus, it may be difficult or impossible for the native database parallelization mechanisms to subdivide the work performed by a table function for multiple slaves in a manner that best matches the characteristics or functionality of a table function.

Figure 6:
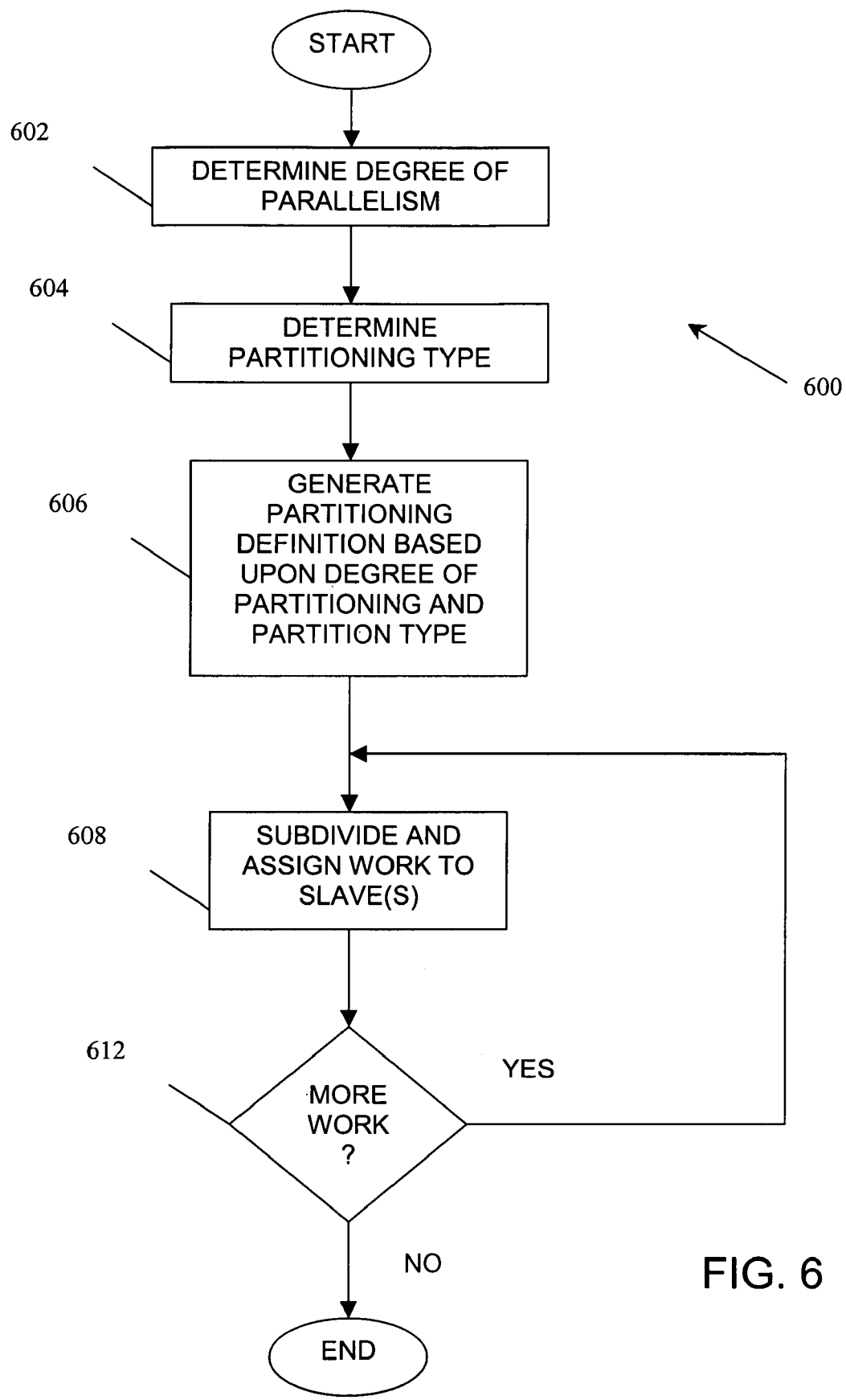
FIG. 6 shows a flowchart of a process for parallel execution of a table function according to an embodiment of the invention.

FIG. 6 depicts the process flow of a method 600 to implement parallel execution of a table function according to an embodiment of the invention. A first step of method 600 is to determine the "degree of parallelism" associated with the table function (602). Degree of parallelism refers to the extent to which an amount of work is subdivided into smaller portions. Many different approaches are appropriate for determining the degree of parallelism associated with a table function.

According to a first approach, the input data source for the table function may be defined to have a specific degree of parallelism that is thereafter adopted by the table function operating upon that data. For example, the base tables that supply data to a table function may be defined to be "parallel" in nature having a specific degree of parallelism. The database system may be configured to recognize metadata associated with base database tables that indicates a preferred degree of parallelism for functions or procedures that operate upon those base tables. In this case, parallelism for a downstream table function is established in a bottom-up manner, by adopting the degree of parallelism associated with its data source. Similarly, if the data source for the table function is a stream of data from another table function that has already been subdivided into a number of parallel execution paths, a convenient degree of parallelism for the downstream table function is one that matches the parallelism of the input data stream.

Alternatively, the database system may establish a degree of parallelism based upon the amount of system resources available for processing the table function. During periods of heavy system activity the database system would establish a lower degree of parallelism, but would establish a greater degree of parallelism during periods of lower system activity. Different levels of priorities could be established for table functions to prioritize the amount of resource assigned to parallelized table functions. Alternatively, the invoker or creator of a table function could statically define the degree of parallelism that is associated with the table function.

An additional step in method 600 is to determine the type of partitioning that should be applied to the input data source (604) to subdivide the work performed by the table function slaves. Without knowing the internal functional details of a table function, it is difficult for a database system to determine the appropriate partitioning scheme to apply to the input data. Thus, according to an embodiment of the invention, a mechanism is provided to supply information to the database system to indicate a desired partitioning method for the input data. This mechanism permits a specific partitioning method to be chosen for a table function, which is thereafter utilized to subdivided the input data into sets of sub-portions for processing by table function slaves. According to this embodiment, one that is knowledgeable about the internal details of a table function, such as for example the creator of the table function, may specify a desired partitioning method that is embedded into the table function declaration. The following represents an example syntax to specify this information for a table function:

```
create function f(p refcur_type) return rec_tab_type pipelined
    parallel_enable (p partition by [<method>(<column list>)]) is
begin . . . end;
```

The "parallel_enable" clause indicates that the function can be executed in parallel. When executing the table function, the "partition by" phrase in the parallel_enable clause specifies the type of partitioning that will be applied to the input data. It also identifies the columns used for partitioning as specified in the <column list> clause.

Any partitioning method may be specified to partition the input data. Examples of suitable partitioning methods include Range, Hash, and "Any" partitioning. Range partitioning decomposes a set of data according to specified ranges of values in a partitioning column. Each range of values is assigned for processing to a separate table function slave. Range partitioning allows rows of data to be partitioned such that the key columns are distinct and monotonically increasing. Hash partitioning decomposes a set of data according to a hash function. One advantage of hash partitioning is that it inherently provides a degree of load balancing for the work assigned to table function slaves. If the functional behavior of the table function is independent of the partitioning of the input data, the keyword "Any" may be inserted into the Partition By clause to allow the runtime system to choose any appropriate method for partitioning the data. Examples of such functions which are not dependent upon a particular partitioning method include functions which take in one row, manipulate its columns, and generate output row(s) based on the columns of this row only.

Based upon the identified degree of parallelism for the table function and the selected partitioning method, a partitioning definition is generated for the input data to the table function (606). The partitioning definition refers to the partitioning criteria that maps each inbound piece of data to an appropriate table function slave. Each data item in the incoming stream of data is assigned to an appropriate slave (608). The data partitioning process continue until there remains no further work in the incoming data stream (612).

As an example, consider an input stream of data that includes a "Month" column. Assume that the defined degree of parallelism for the table function calls for four separate slaves and that it is desired to partition the input data based upon values in the Month column.

The following represents an example declaration for a table function if Range partitioning is employed:

```
create function f(p refcur_type) return rec_tab_type
    parallel_enable (s partition by RANGE (Month_Column)) is
begin . . . end;
```

According to an embodiment, this function declaration indicates to the database system that range-based partitioning should be utilized to sub-divide the input data, in which the Month column is used as the partitioning column. Since the degree of parallelism calls for four slaves, the input data is partitioned into four separate data portions. In one embodiment, once the type of partitioning to be applied is selected by the user (e.g. partitioning by range), the database system performs the task of deciding the exact partitioning specifications that should be used to divide the data. In an alternate approach, the user could provide the exact parameters of the partitioning that should be applied. The following represents an illustrative partitioning definition that may be selected, e.g. by a database system, to implement range-based partitioning of input data for the above-example declaration:

```
PARTITION BY RANGE ( Month_Column )
(   PARTITION s1 for values from January and March),
    PARTITION s2 for values from April and June,
    PARTITION s3 for values from July and September,
    PARTITION s4 for values from October and December );
```

Figure 7A:
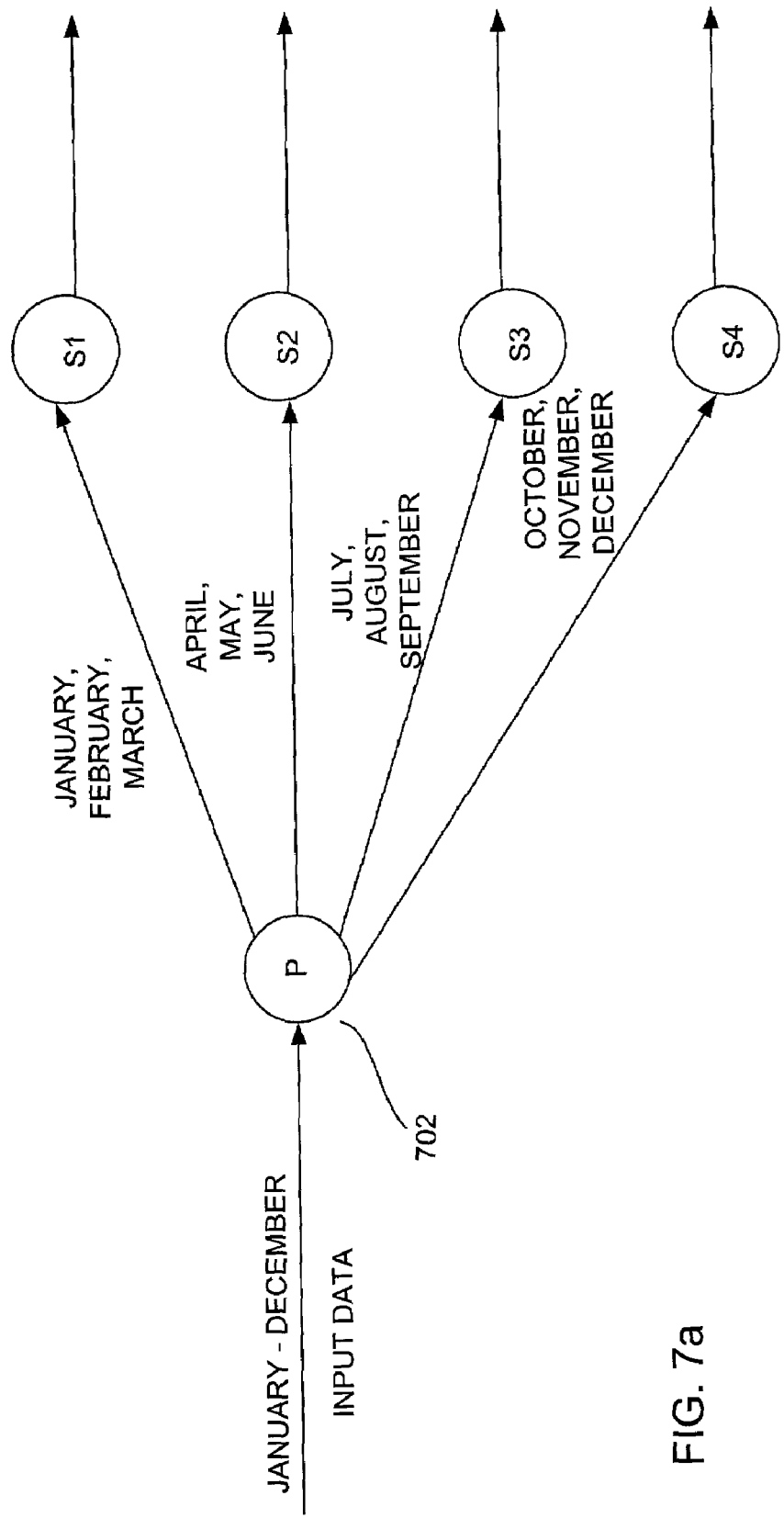
FIGS. 7a and 7b pictorially show range partitioning of work among a plurality of table function slaves according to embodiment(s) of the invention.

Pursuant to this partitioning criteria, input data corresponding to the first three months of the year ("January", "February", and "March" in the Month column) are assigned to a first partition/slave s1, input data corresponding to the second three months of the year ("April", "May", and "June" in the Month column) are assigned to a second partition/slave s2, input data corresponding to the third three months of the year ("July", "August", and "September" in the Month column) are assigned to partition/slave s3, and input data corresponding to the last three months of the year ("October", "November", "and "December" in the Month column) are assigned to partition/slave s4. FIG. 7*a* graphically depicts this partitioning definition applied to an inbound data stream. A first processing entity 702 receives the input data stream and applies the partitioning definition to separate the input data into four separate portions. Each data portion is sent to its corresponding slave (s1–s4) for processing.

Figure 7B:
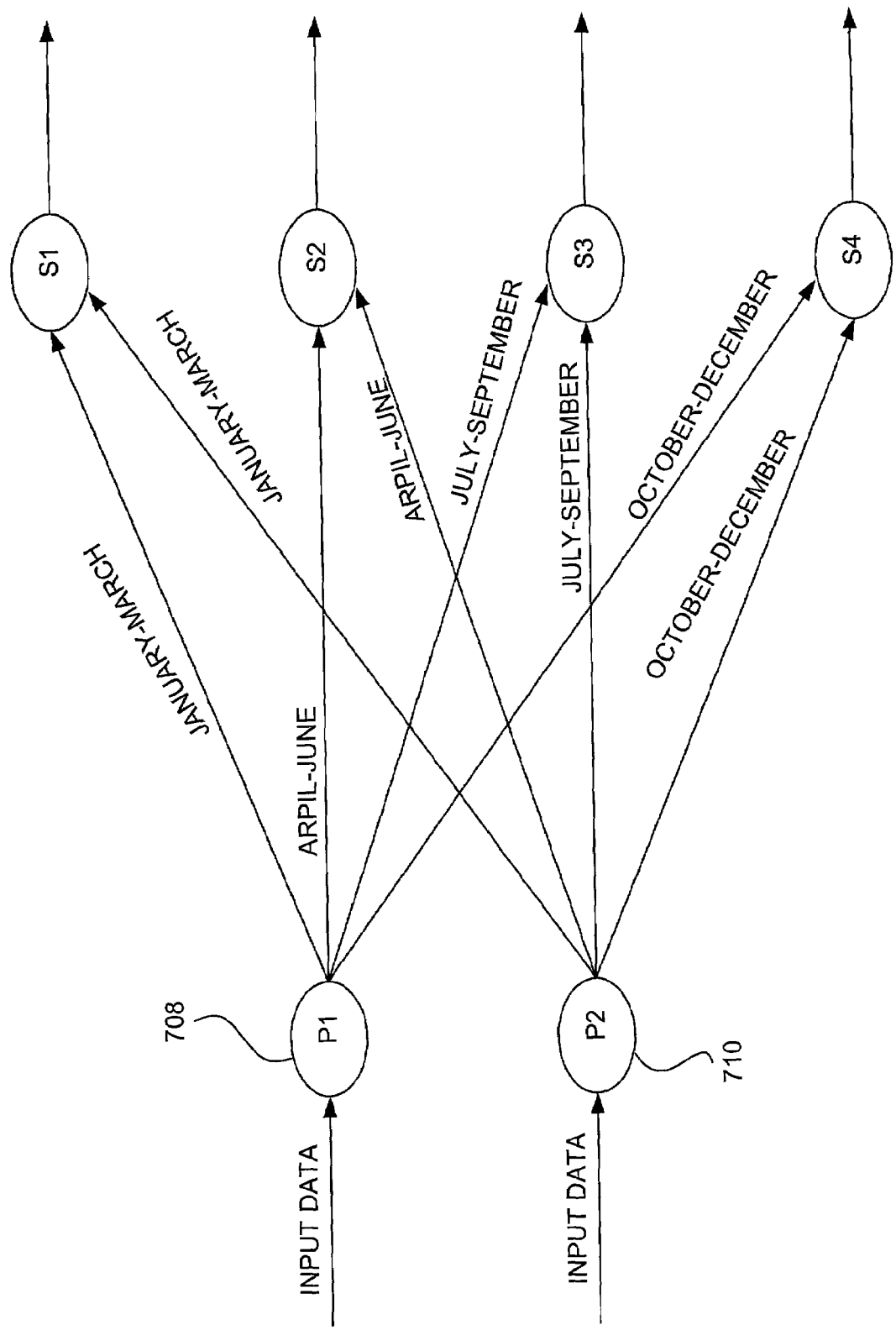

Since a general partitioning definition has been established, any number of processing entities can be used to separate an incoming stream of data for a set of destination slaves. This is pictorially represented in FIG. 7b, in which two separate processing entities are employed to partition the inbound data and direct the partitioned data portions to corresponding slaves. Each processing entity 708 and 710 need only apply the partitioning criteria to determine which of the table functions slaves s1–s4 correspond to a particular item of input data.

A database system may have a significant scope of discretion with respect to the partition criteria it establishes based upon the defined degree of parallelism and the parameters of the Partition By clause. For example, the above partitioning criteria created partitioning based upon the following ranges: January–March, April–June, July–September, and October–December. For various reasons, e.g., load-balancing, it may be desirable to partition based upon other sets of ranges, such as: December–February, March–May, June–August, and September–November. So long as the database system complies with a desired partitioning method and degree of parallelism, many alternate partitioning criteria could be applied with similar validity to a set of input data.

For this same example, the following represents an example declaration for a table function if Hash partitioning is employed:

```
create function f(p refcur_type) return rec_tab_type
    parallel_enable (p partition by Hash (Month_Column)) is
begin . . . end;
```

In this table function declaration, hash-based partitioning is specified for the input data. Recall that the degree of parallelism defined for the table function calls for a set of four slaves to process the input data. Thus, the following represents example pseudocode for partitioning definition that may be generated for Hash partitioning of the input data:

```
PARTITION BY HASH ( Month_Column )
(    PARTITION into 4 partitions named s1, s2, s3, and s4);
```

Here, four separate partitions have been defined to match the defined degree of parallelism for the table function. Any hash function suitable for a desired hashing result can be employed. The above example partition definition thus only indicates the number of hashing partitions to employ, without necessarily describing the exact hash function to use. Alternatively, a particular hash function may be specified. If a simple round-robin hash function is employed in this example, then every fourth unique data value in the Month column would hash to the portion of data for the same slave. Thus, input data having the values "January", "May", and "September" in the Month column are assigned to partition/slave s1, input data having the values "February", "June", and "October" in the Month column are assigned to partition/slave s2, input data having the values "March", "July", and "November" in the Month column are assigned to partition/slave s3, and input data having the values "April", "August", "and "December" in the Month column are assigned to partition/slave s4.

Figure 8:
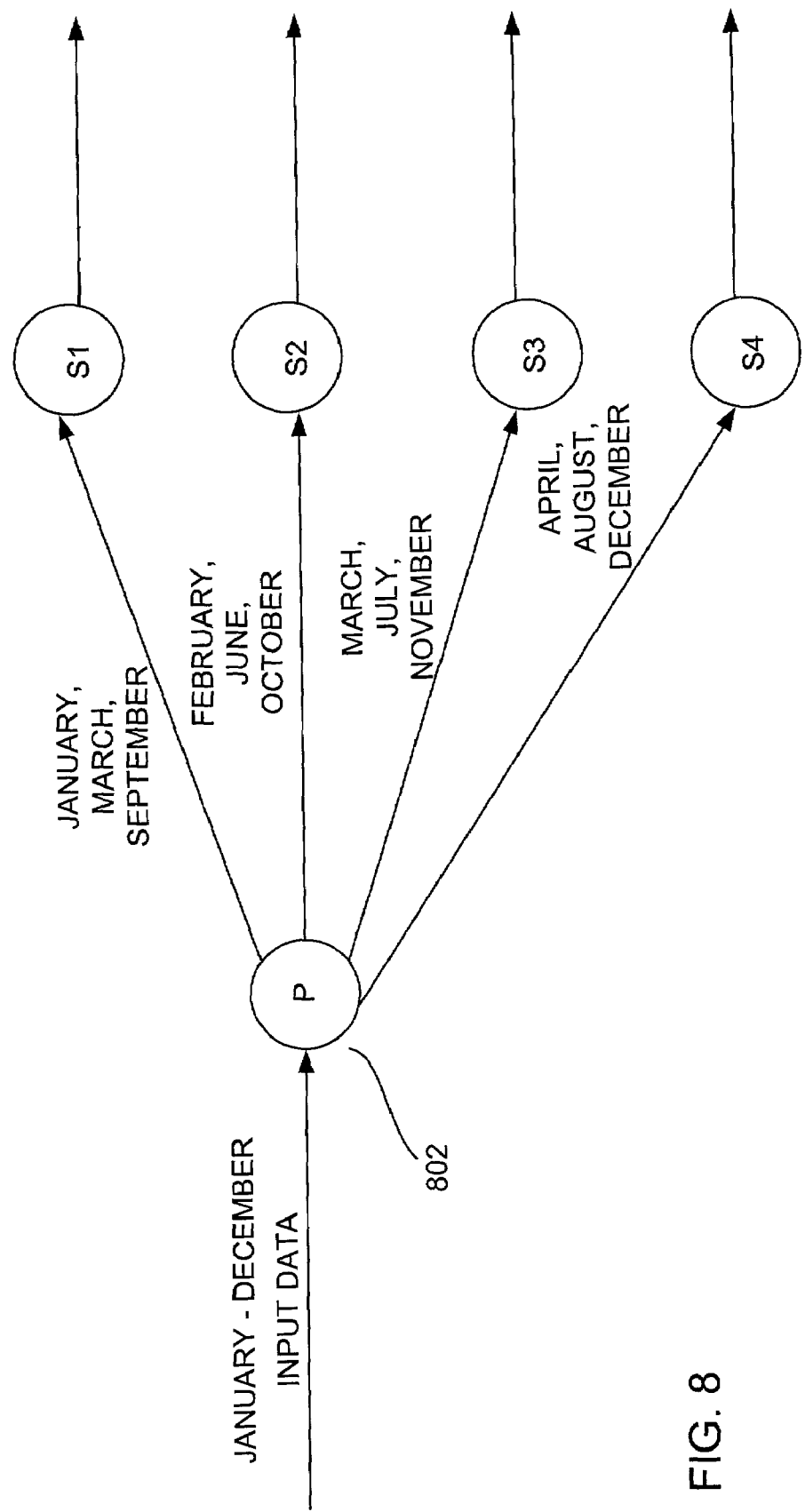
FIG. 8 pictorially shows hash partitioning of work according to an embodiment of the invention.

This partitioning definition is applied to the input data stream to subdivide the input data into appropriate sub-portions. FIG. 8 graphically depicts this partitioning criteria applied to an inbound data stream. A first process entity 802 receives the input data stream and applies the partitioning criteria to separate the input data into four separate portions. Each data portion is sent to its corresponding slave (s1–s4) for processing. Similar to FIG. 7b, any number of processing entities can be employed to separate the incoming data stream into the appropriate sub-portions of data for processing by the appropriate slaves.

The output from multiple slaves may be evaluated in many different ways. For example, the output from multiple slaves could be separated or merged in various combinations before being sent to a next downstream consumer. Multiple downstream slaves acting in parallel may process the parallel outputs from multiple table function slaves.

Parallel and Pipelined Enabled Table Functions

Figure 9:
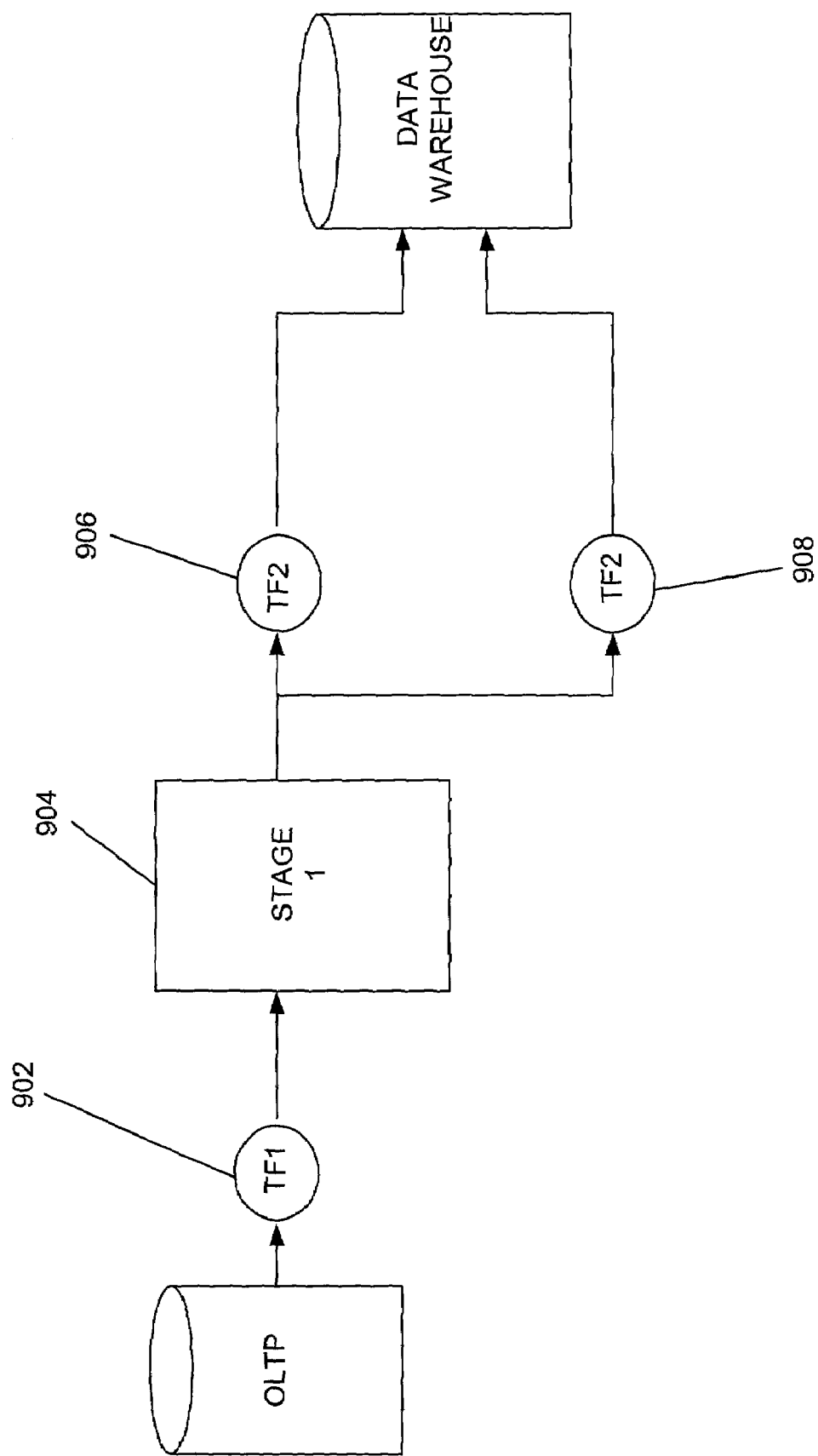
FIG. 9 depicts routing data from a table function to multiple consumers using stages according to an embodiment of the invention.

An embodiment of the present invention also allows integration between pipelining and execution of multiple table functions in parallel. Referring to FIG. 9, shown is one approach for directing output data from a first table function to be processed by multiple downstream table functions in parallel. In this approach, the output of a first table function 902 is staged 904 before processing by downstream table functions. Thus, the entire output of table function 902 is materialized into a table or collection, which is then routed as two separate sets of data. Each separate set of data is thereafter sent to two independent invocations 906 and 908 of the same table function for further processing. Table functions 906 and 908 may operate in parallel, since in this example, there are no interactions or data dependencies between these two table functions.

Figure 10:
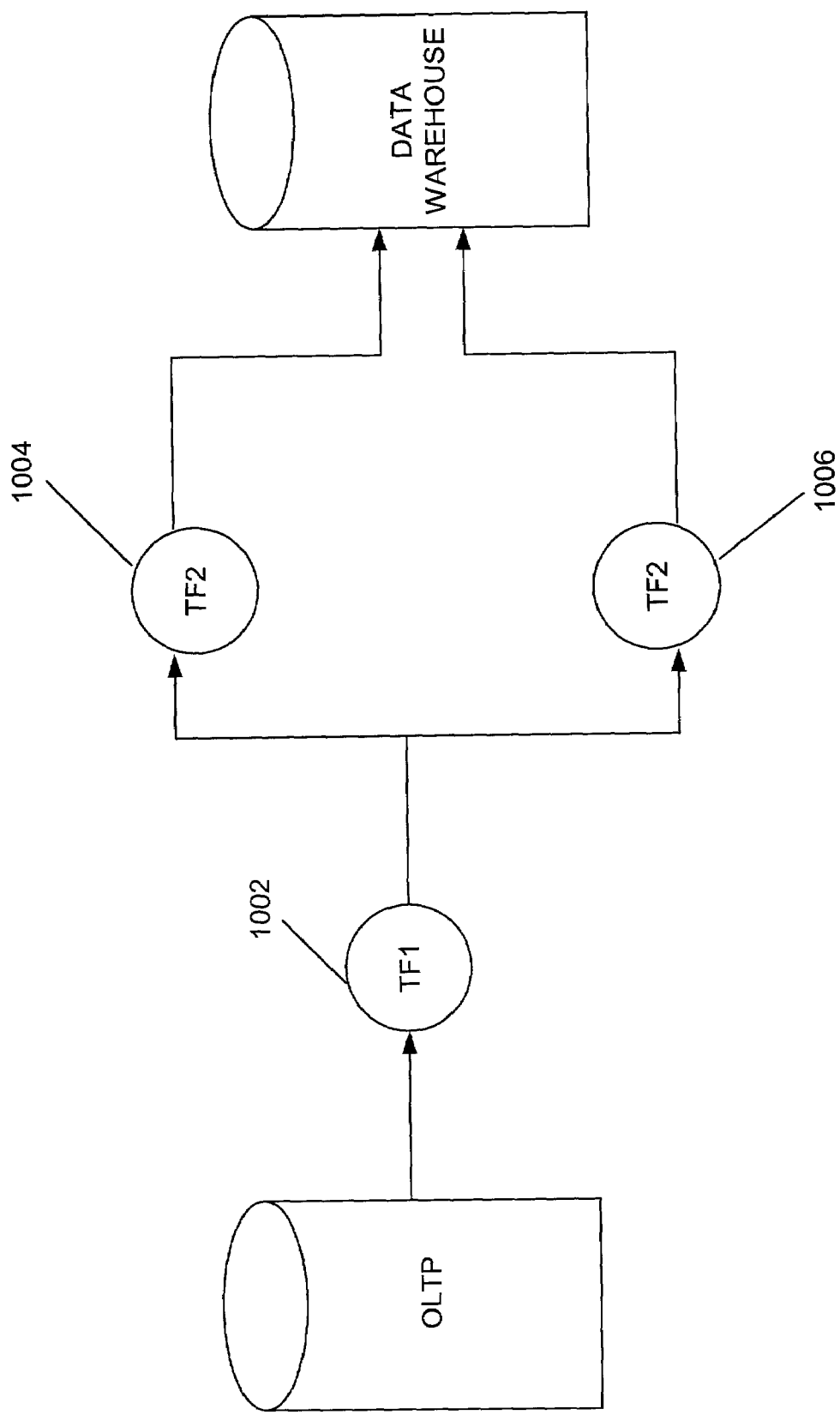
FIG. 10 depicts pipelining data from a table function to multiple consumers according to an embodiment of the invention.

Alternatively, a table function can be pipelined enabled to avoid the staging step 904 as shown in FIG. 9. Referring to FIG. 10, shown is an alternate approach in which a table function 1002 pipelines output data to two separate downstream table functions 1004 and 1006 (which are independent invocations of the same table function). Under this approach, the pipelining mechanism disclosed above is configured such that the retrieved data from a producer table function is sent by the database server to multiple consumers. The database server maintains configuration information pertaining to the number of pipeline consumers that receive data from a particular consumer and routes data to each of these downstream consumers.

In one embodiment, the entire set of output data from table function 1002 is sent to each downstream table function 1004 and 1006. However, a partitioning method may be employed by the database sever to selectively send a subset of the output data to each downstream consumer table function. For example, range based partitioning may be employed to subdivide the output data from table function 1002. Based upon a selected partitioning method, the database server maintains partitioning definition that determines which items of data retrieved from a producer table function should be passed to particular consumers of that data. As each subset of data is fetched from table function 1002, the partitioning definition is applied to determine which of the downstream consumer maps to that data. Each of these data subsets is thereafter routed to the appropriate downstream consumer.

In a preferred embodiment, each consumer runs in a separate execution thread so that the consumers are independent of and in parallel to each other. The producer preferably runs in a separate execution thread from any of the consumers. Alternatively, the producer may share an execution thread with one of the consumer entities.

Figure 11A:
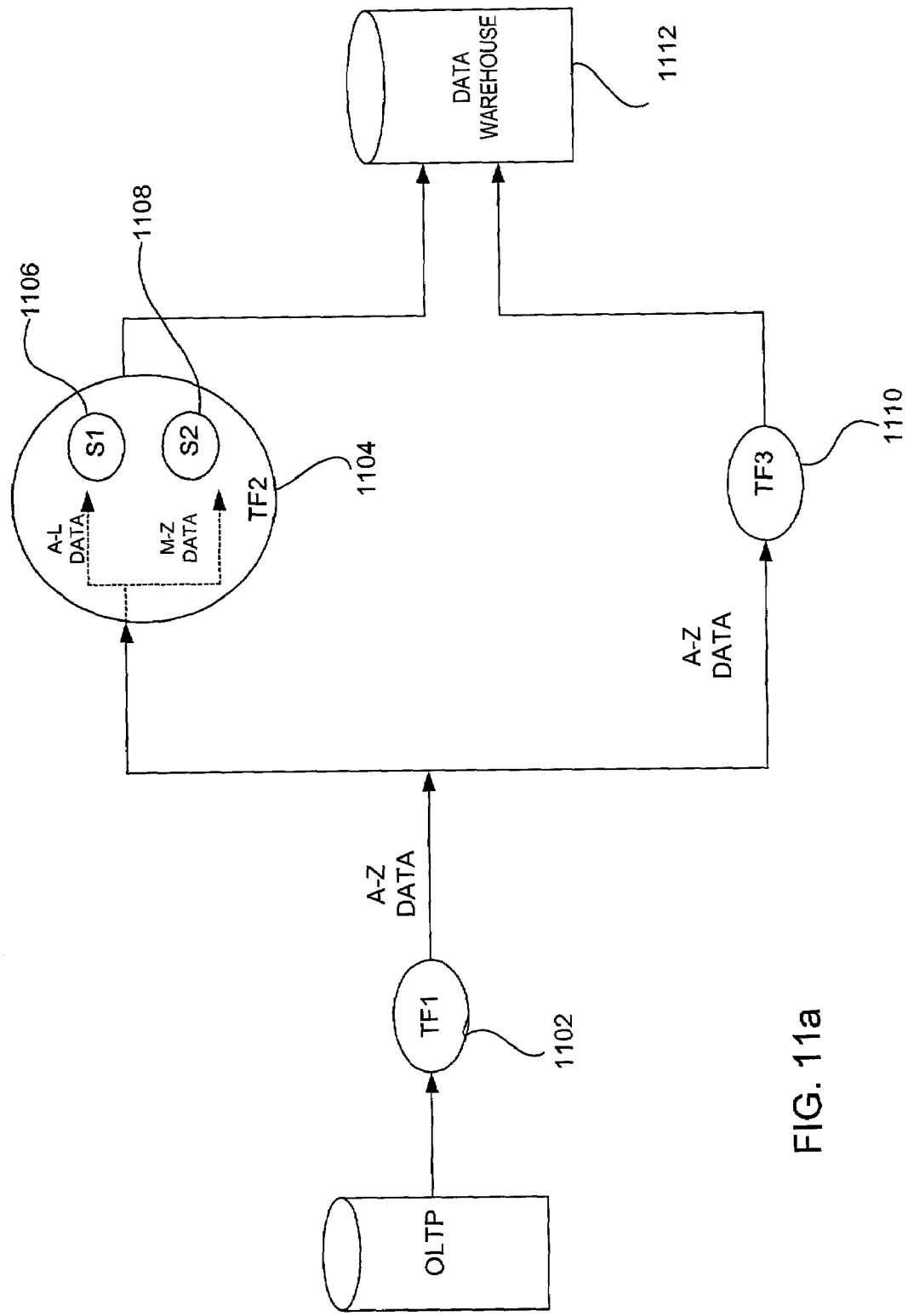
FIGS. 11a and 11b depict pipelining table functions that is executed in parallel according to an embodiment of the invention.

FIG. 11a shows an embodiment of the invention in which the pipelined output of a first table function 1102 is sent to a table function 1104 that executes in parallel. In this approach, table function 1104 is executed in parallel by slaves 1106 and 1108. As disclosed above a partitioning definition can be created to determine the routing of data sent from table function 1102 to each of the slaves 1106 and 1108. The partitioning definition established for multiple-consumer pipelining is logically similar to the partitioning definition shown above with respect to parallel execution of table functions. The database server utilizes the partitioning definition to determine which of the output data from table function 1102 is sent to the respective slaves 1106 and 1108.

In this approach, each fetch operation performed against table function 1102 retrieves multiple levels of mapping to determine the appropriate consumer. A first mapping determines whether a particular data item is sent to either, or both, of table function 1104 and 1110. If a data item is sent to table function 1104, then the partitioning definition is applied to determine which table function slave 1106 or 1108 corresponds to that data item. Any partitioning method can be employed according to the invention, including hash or rage partitioning as disclosed above. The output of table function 1104 can be merged before being sent to data warehouse 1112. Alternatively, the parallel outputs from slaves 1106 and 1108 can be processed in parallel before insertion into data warehouse 1112.

Figure 11B:
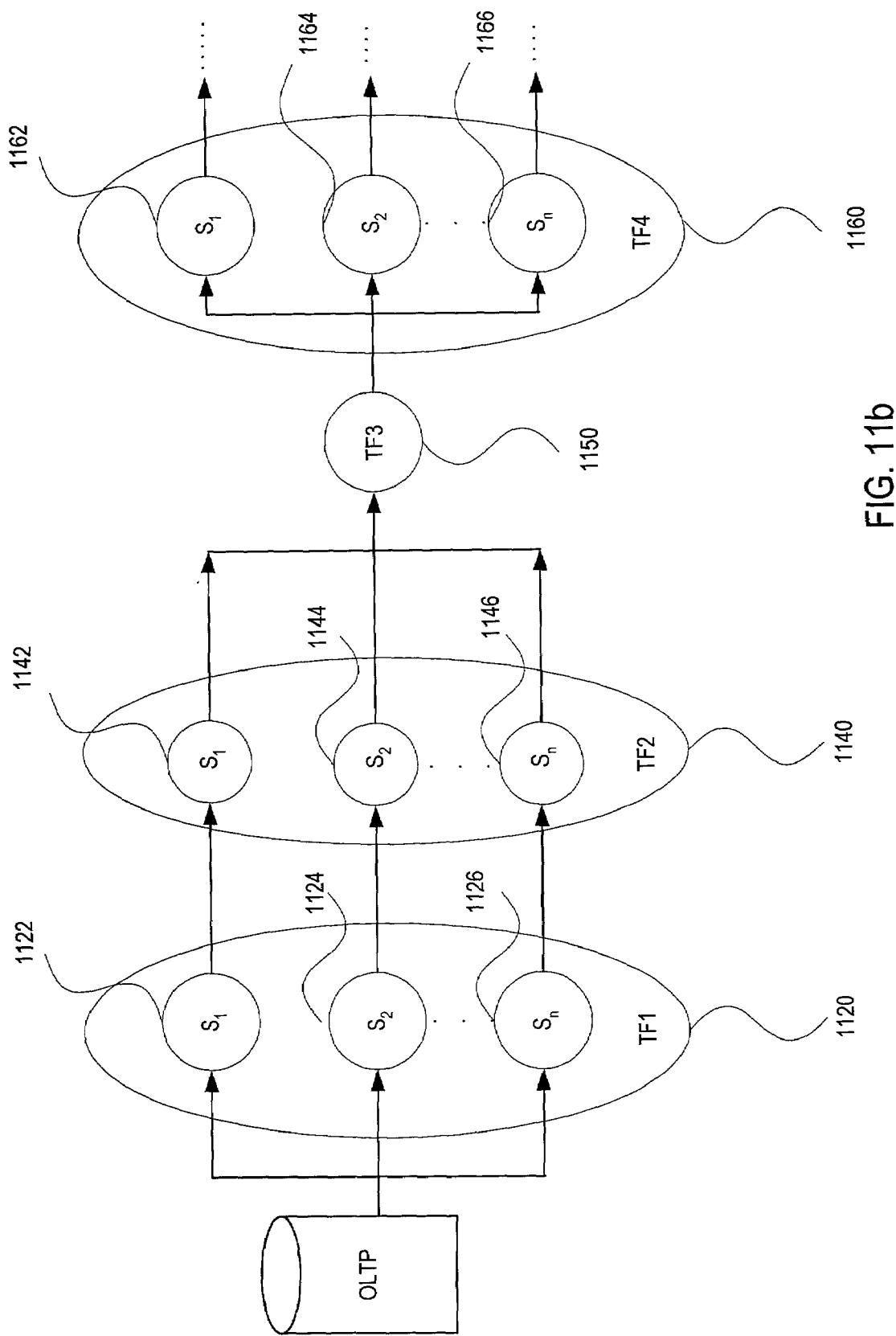

FIG. 11b shows another embodiment of the invention in which multiple slaves 1122, 1124, and 1126 execute a first table function 1120 in parallel. The output from table function 1120 is sent pipelined and in parallel to a second table function 1140, which also executes in parallel (using slaves 1142, 1144, and 1146) and which outputs a pipelined result. A chain of parallel and pipelined table function can therefore be implemented using this embodiment of the invention. The output of a parallel executed table function 1140 can also be pipelined to a table function 1150 that does not execute in parallel. The output of table function 1150 can thereafter be pipelined to another table function 1160 that executes in parallel.

When a table function fetches rows from one or more input streams, the processing of a stream of rows inside a table function may require that the stream be ordered or clustered on a particular set of keys. This can be required for correctness (e.g. to compute user-defined aggregates, the input rows should be clustered on the grouping keys) or efficiency (e.g. the function has to fetch every row in an input stream only once).

The function writer can specify this behavior of an input stream, according to an embodiment, by extending the function syntax with an ORDER BY or CLUSTER BY clause. Stream ordering works with both serial and parallel table functions. However, for parallel table functions, the ORDER or CLUSTER BY clause should be defined on the same cursor as defined for the PARTITION BY clause, in which only the stream partitioned for parallelism is ordered.

In an embodiment, the ORDER BY clause has the same semantics of global ordering as the ORDER BY clause in SQL. In contrast, the CLUSTER BY clause simply requires that the rows with same key values appear together in the input stream; however, it does not place any restrictions on the ordering of rows with different key values. The ORDER BY or CLUSTER BY is implemented in an embodiment by adding a SORT or HASH iterator between the table function iterator and the top iterator of the query tree corresponding to the input cursor. For parallel table functions, the SORT or HASH iterator is applied on all parallel server processes evaluating the table function after it fetches rows from the input table queue implementing the PARTITION BY.

In an embodiment, the ordering requirement on the input stream is a property of the table function and is specified by the table function implementor. Since the database ensures the appropriate ordering, it places no burden on the invoker of the table function to explicitly order or cluster the input stream to ensure correctness or performance.

New join methods can be implemented by table functions of the present invention that accepts multiple input streams. This is particularly useful in implementing parallel joins of user-defined types. For example, the Oracle Spatial Cartridge, available from Oracle Corporation, defines a Geometry object type and an R-tree indexing scheme. Table functions can be used to implement joins of geometries based on their spatial relationships. Consider the join of two geometry tables Parks_table and Roads_table using an operator called Overlaps. Assume that R-tree indexes have been created and stored in tables Parks_idx and Roads_idx.

```
SELECT * FROM Parks_table P, Roads_table R
WHERE Overlaps(P.geometry, R.geometry)
```

The WHERE clause can be rewritten to use a table function JoinF( ) as follows:

```
WHERE (P.rowid, R.rowid) in
    (SELECT * FROM TABLE(
        JoinFn(query on root entries of Parks_idx,
            query on root entries of Roads_idx,
            <metadata arguments>)))
```

In this example, JoinF( ) is a table function that takes a pair of root entries, one each from each R-tree, and joins the subtrees corresponding to them using a nested table function RootjoinFn( ). The table function returns the set of satisfying pairs of rowids. The inputs to JoinFn( ) are queries over the tables that store the R-tree indexes and some associated metadata.

In one embodiment, JoinFn( ) is implemented as a pipelined and parallel table function using ANY partitioning and a nested-loop join semantics as follows:

```
create function
    JoinFn(p1 RidCurType, p2 RidCurType, metadata)
    return RidPairType pipelined
    parallel_enable(p1 partition by any) is
begin
    for rid1 in p1 loop
        for rid2 in p2 loop
            stmt := "select *
                from TABLE(RootJoinFn(rid1,
                    rid2, metadata))";
            for each rowid-pair
                returned from execution of "stmt"
                pipe row(<rowid-pair>);
            end for;
        end loop;
    end loop;
end;
```

Pipelined and parallel-enabled table functions can be used for parallel creation of domain (extensible) indexes. A domain index is an index whose structure is not native to the system and which can be defined by a user. In one approach to implementing user-defined indexes, data that identifies access routines for the user-defined indexes are registered with a database system. In response to relevant statements issued by the database system, the registered routines are called to create or access an index structure relating to the data corresponding to the user-defined index. More information regarding an implementation of domain indexes in described in U.S. Pat. No. 5,893,104, entitled "Extensible Indexing," issued on Apr. 6, 1999, which is hereby incorporated by reference in its entirety.

One approach for creating a domain index includes the following steps: (1) Create table(s) for storing the index data; (2) fetch the relevant data (typically the index key values and row identifiers) from the base table, transform it, and insert relevant transformed data into the table created for storing the index data; and, (3) build secondary indexes on the tables that store the index data, for faster access during query.

If the size of data to be indexed is large, step 2 may provide a performance bottleneck. However, using the present invention, step 2 can be paralleled by modeling it as a parallel table function (e.g., ParallelIndexLoad( )) and invoking this function from an index creation function as follows:

```
INSERT INTO <DomainIndexTable>
SELECT * FROM
   TABLE(ParallelIndexLoad(index_metadata,
      SELECT <key_cols>, <row ids>
      FROM <BaseTable>));
```

System Architecture Overview

Figure 12:
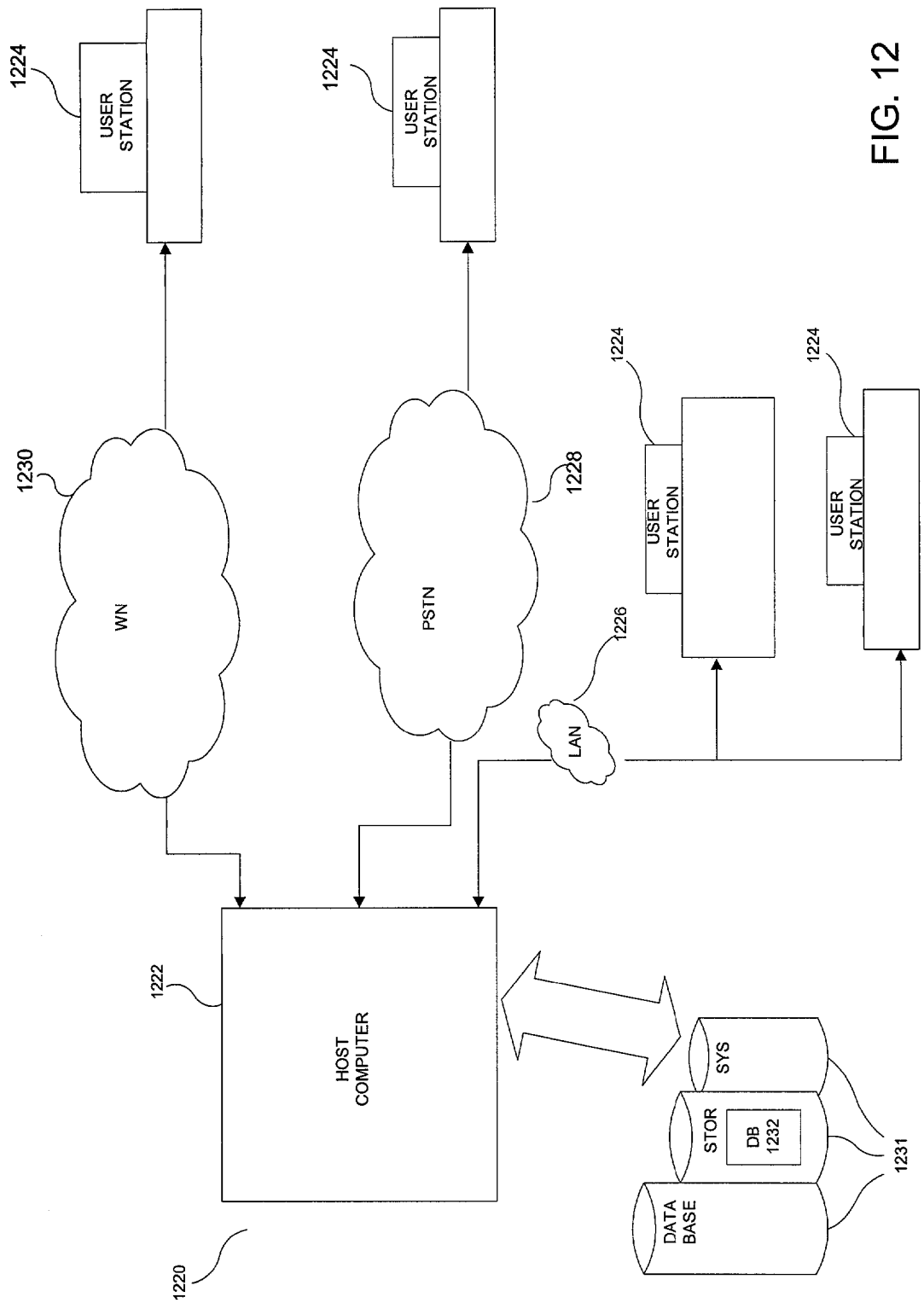
FIG. 12 is a diagram of a system architecture with which the present invention can be implemented.

Referring to FIG. 12, in an embodiment, a computer system 1220 includes a host computer 1222 connected to a plurality of individual user stations 1224. In an embodiment, the user stations 1224 each comprise suitable data terminals, for example, but not limited to, e.g., computers, computer terminals or personal data assistants ("PDAs"), which can store and independently run one or more applications. For purposes of illustration, some of the user stations 1224 are connected to the host computer 1222 via a local area network ("LAN") 1226. Other user stations 1224 are remotely connected to the host computer 1222 via a public telephone switched network ("PSTN") 1228 and/or a wireless network 1230.

In an embodiment, the host computer 1222 operates in conjunction with a data storage system 1231, wherein the data storage system 1231 contains a database 1232 that is readily accessible by the host computer 1222. In alternative embodiments, the database 1232 may be resident on the host computer. In yet alternative embodiments, the database 1232 may be read by the host computer 1222 from any other medium from which a computer can read. In an alternative embodiment, the host computer 1222 can access two or more databases 1232, stored in a variety of mediums, as previously discussed.

Figure 13:
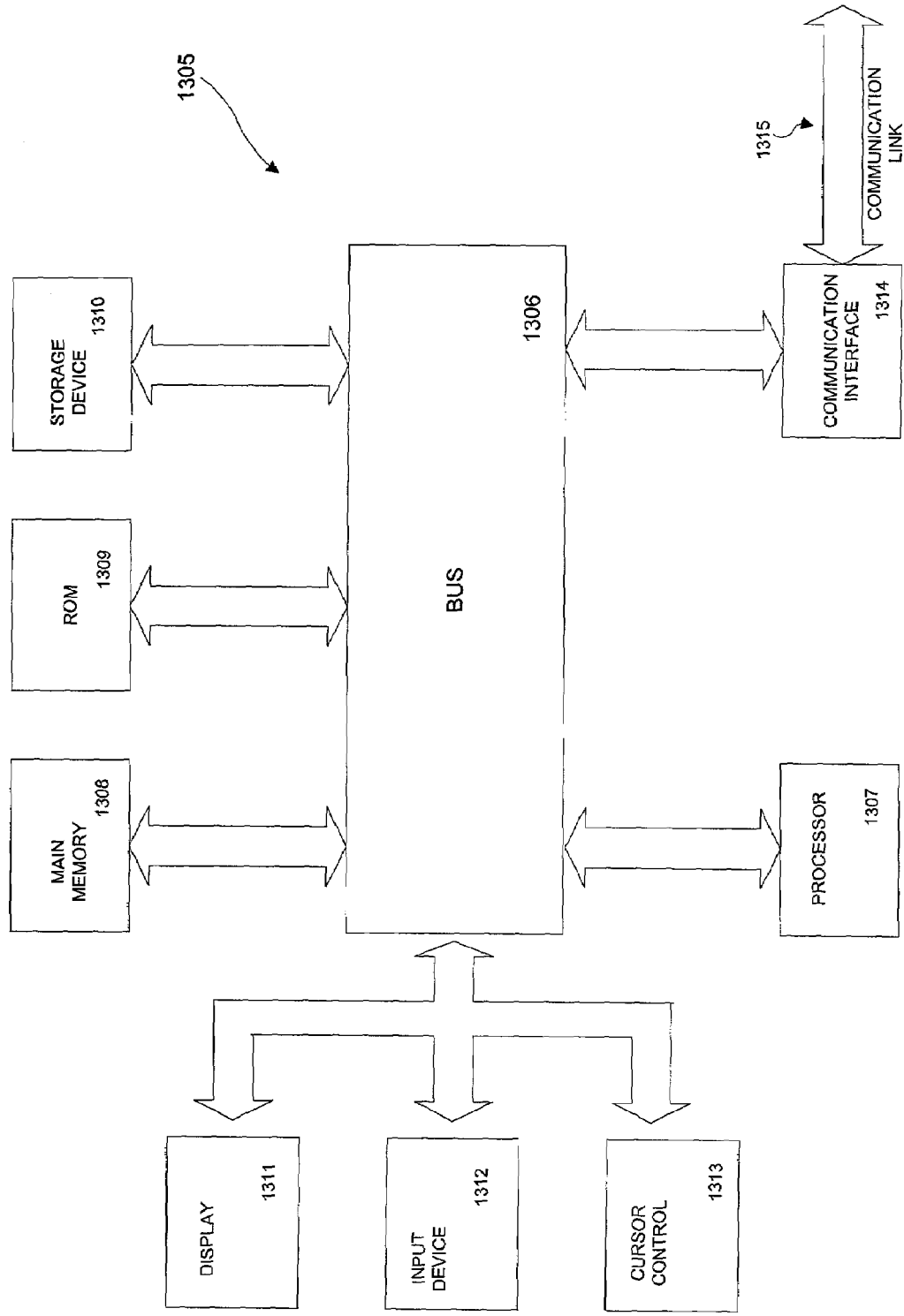
FIG. 13 is an additional diagram of a system architecture with which the present invention can be implemented.

Referring to FIG. 13, in an embodiment, each user station 1224 and the host computer 1222, each referred to generally as a processing unit, embodies a general architecture 1305. A processing unit includes a bus 1306 or other communication mechanism for communicating instructions, messages and data, collectively, information, and one or more processors 1307 coupled with the bus 1306 for processing information. A processing unit also includes a main memory 1308, such as a random access memory (RAM) or other dynamic storage device, coupled to the bus 1306 for storing dynamic data and instructions to be executed by the processor(s) 1307. The main memory 1308 also may be used for storing temporary data, i.e., variables, or other intermediate information during execution of instructions by the processor(s) 1307.

A processing unit may further include a read only memory (ROM) 1309 or other static storage device coupled to the bus 1306 for storing static data and instructions for the processor(s) 1307. A storage device 1310, such as a magnetic disk or optical disk, may also be provided and coupled to the bus 1306 for storing data and instructions for the processor(s) 1307. A processing unit may be coupled via the bus 1306 to a display device 1311, such as, but not limited to, a cathode ray tube (CRT), for displaying information to a user. An input device 1312 is coupled to the bus 1306 for communicating information and command selections to the processor(s) 1307. A user input device may include a cursor control 1313 for communicating direction information and command selections to the processor(s) 1307 and for controlling cursor movement on the display 1311.

According to one embodiment of the invention, the individual processing units perform specific operations by their respective processor(s) 1307 executing one or more sequences of one or more instructions contained in the main memory 1308. Such instructions may be read into the main memory 1308 from another computer-usable medium, such as the ROM 1309 or the storage device 1310. Execution of the sequences of instructions contained in the main memory 1308 causes the processor(s) 1307 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1307. Such a medium may take many forms, including, but not limited to, non-volatile, volatile and transmission media. Non-volatile media, i.e., media that can retain information in the absence of power, includes the ROM 1309. Volatile media, i.e., media that can not retain information in the absence of power, includes the main memory 1308. Transmission media includes coaxial cables, copper wire and fiber optics, including the wires that comprise the bus 1306. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications. Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 1307 can retrieve information.

Various forms of computer-usable media may be involved in providing one or more sequences of one or more instructions to the processor(s) 1307 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 1306 may receive the infrared signals and place the instructions therein on the bus 1306. The bus 1306 may carry the instructions to the main memory 1308, from which the processor(s) 1307 thereafter retrieves and executes the instructions. The instructions received by the main memory 1308 may optionally be stored on the storage device 1310, either before or after their execution by the processor(s) 1307.

Each processing unit may also include a communication interface 1314 coupled to the bus 1306. The communication interface 1314 provides two-way communication between the respective user stations 1224 and the host computer 1222. The communication interface 1314 of a respective processing unit transmits and receives electrical, electromagnetic or optical signals that include data streams representing various types of information, including instructions, messages and data. A communication link 1315 links a respective user station 1224 and a host computer 1222. The communication link 1315 may be a LAN 1226, in which case the communication interface 1314 may be a LAN card. Alternatively, the communication link 1315 may be a PSTN 1228, in which case the communication interface 1314 may be an integrated services digital network (ISDN) card or a modem. Also, as a further alternative, the communication link 1315 may be a wireless network 1230. A processing unit may transmit and receive messages, data, and instructions, including program, i.e., application, code, through its respective communication link 1315 and communication interface 1314. Received program code may be executed by the respective processor(s) 1307 as it is received, and/or stored in the storage device 1310, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

The invention claimed is:

1. A method for pipelining a table function in a database system, comprising:
    a) performing a set up operation when the table function is called, the table function being a user-defined function that produces rows of data and used in selection, iteration, or aggregation database query language statements;
    b) fetching a subset of output data from a data producer;
    c) sending the subset of the output data to a first consumer of the output data, wherein the first consumer is the table function;
    d) repeating steps b) and c) until all the output data has been fetched from the data producer.

2. The method of claim 1 in which the act of performing a setup operation comprises setting up a context object to maintain state.

3. The method of claim 1 in which the data producer comprises a second table function.

4. The method of claim 1 in which the subset of the output data comprises a single data object or row of data.

5. The method of claim 1 in which the subset of the output data comprises a plurality of data objects or rows of data.

6. The method of claim 1 further comprising:
    e) performing a close operation after all the output data has been fetched from the data producer.

7. The method of claim 6 in which the act of performing the close operation comprises garbage collection operations.

8. The method of claim 7 in which the garbage collection operations comprises removal of a context object.

9. The method of claim 1 in which the table function executes in a different execution thread than the data producer.

10. The method of claim 1 in which the table function and the data producer execute from an identical execution thread.

11. The method of claim 1 in which a callback function is passed from the table function.

12. The method of claim 11 in which the callback function is executed on each subset of the output data fetched from the data producer.

13. The method of claim 1 in which the data producer comprises a dynamically configurable return type.

14. The method of claim 13 in which the dynamically configurable return type is established at compile time.

15. The method of claim 1 in which steps a) through d) are implemented within a database query language statement.

16. The method of claim 15 in which the database query language statement comprises SQL.

17. The method of claim 1 in which the subset of the output data is pipelined to a database query language statement.

18. The method of claim 17 in which a callback function is invoked for the subset of the output data.

19. The method of claim 18 in which the callback function filters inappropriate data.

20. The method of claim 1 further comprising:
    e) send the subset of the output data to a second consumer of the output data.

21. The method of claim 20 further comprising the step of determining whether the subset of the output data should be routed to the first consumer or the second consumer;
    executing step c) if the subset of the output data should be routed to the first consumer;
    and
    executing step e) if the subset of the output data should be routed to the second consumer.

22. The method of claim 21 in which a partitioning definition is applied to determine whether the subset of the output data should be routed to the first consumer or the second consumer.

23. The method of claim 22 in which the partitioning definition comprises either hash or range based partitioning.

24. The method of claim 1 in which the first consumer processes the subset of the output data in parallel.

25. The method of claim 24 in which multiple slaves exist to process the subset of the output data.

26. The method of claim 25 further comprising the step of determining which of the multiple slaves operate upon the subset of the output data.

27. The method of claim 26 in which a partitioning definition is established to route the subset of the output data to an appropriate one of the multiple slaves.

28. The method of claim 27 in which the partitioning definitions comprises either hash or range based partitioning.

29. The method of claim 1 further comprising:
optimizing a query comprising the table function.

30. The method of claim 29 in which statistics for the table function are passed to an optimizer.

31. The method of claim 29 in which an optimizer self-determines statistics to optimize the query.

32. A system for pipelining table functions, comprising:
a) means for performing a set up operation when the table function is called, the table function being a user-defined function that can produce rows of data and used in selection, iteration, or aggregation database query language statements;
b) means for fetching a subset of output data from the table function;
c) means for sending the subset of the output data to a first consumer of the output data;
d) means for repeating steps b) and c) until all the output data has been fetched from the table function.

33. The system of claim 32 further comprising means for a data producer to produce data to be sent to the table function, in which the data producer comprises a second table function.

34. The system of claim 33 in which the table function executes in the same or in a different execution thread than the data producer.

35. The system of claim 32 in which a callback function is passed from the table function.

36. The system of claim 33 in which the data producer comprises a dynamically configurable return type.

37. The system of claim 32 in which the subset of the output data is pipelined to a database query language statement.

38. A computer program product comprising a storageable computer useable storage medium having executable code to execute a process for pipelining table functions, comprising:
a) executable code for performing a set up operation when the table function is called, the table function being a user-defined function that can produce rows of data and used in selection, iteration, or aggregation database query language statements;
b) executable code for fetching a subset of output data from the table function;
c) executable code for sending the subset of the output data to a first consumer of the output data;
d) executable code for repeating steps b) and c) until all the output data has been fetched from the table function.

39. The computer program product of claim 38 further comprising executable code for a data producer to produce data to be sent to the table function, in which the data producer comprises a second table function.

40. The computer program product of claim 39 in which the executable code for the table function executes in the same or in a different execution thread than the executable code for the data producer.

41. The computer program product of claim 38 further comprising executable code in which a callback function is passed from the table function.

42. The computer program product of claim 39 in which the executable code for the data producer comprises a dynamically configurable return type.

43. The computer program product of claim 38 further comprising executable code in which the subset of the output data is pipelined to a database query language statement.

* * * * *